US007618314B2

(12) United States Patent
Seelig et al.

(10) Patent No.: US 7,618,314 B2
(45) Date of Patent: Nov. 17, 2009

(54) IMAGE ALIGNMENT GAMING DEVICE AND METHOD

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 904 days.

(21) Appl. No.: 10/811,104

(22) Filed: Mar. 26, 2004

(65) Prior Publication Data

US 2004/0192427 A1 Sep. 30, 2004

Related U.S. Application Data

(63) Continuation-in-part of application No. 10/664,228, filed on Sep. 16, 2003, now Pat. No. 7,040,620, and a continuation-in-part of application No. 10/245,623, filed on Sep. 16, 2002, which is a continuation-in-part of application No. 09/967,055, filed on Sep. 28, 2001, now Pat. No. 6,814,665, which is a continuation-in-part of application No. 09/967,033, filed on Sep. 28, 2001, now Pat. No. 6,719,630.

(60) Provisional application No. 60/241,384, filed on Oct. 17, 2000, provisional application No. 60/503,325, filed on Sep. 15, 2003.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................. 463/16; 463/13; 463/14; 463/15; 463/17; 463/18; 463/19

(58) Field of Classification Search .............. 463/13–19
See application file for complete search history.

(56) References Cited

U.S. PATENT DOCUMENTS

| | | | | | |
|---|---|---|---|---|---|
| 1,373,679 | A | * | 4/1921 | Silkworth et al. | 273/142 R |
| 4,405,131 | A | * | 9/1983 | Horvath | 273/153 S |
| 4,407,502 | A | * | 10/1983 | Paulos | 273/153 S |

(Continued)

FOREIGN PATENT DOCUMENTS

EP 71455 A2 * 2/1983

(Continued)

*Primary Examiner*—John M Hotaling, II
*Assistant Examiner*—Adetokunbo Torimiro
(74) *Attorney, Agent, or Firm*—Ian F. Burns & Associates, P.C.

(57) ABSTRACT

A gaming device involving a three-dimensional figure with a plurality of three-dimensional sections, each section having height, width and depth, is disclosed. At least one three-dimensional section is moveable relative to other sections, includes a plurality of three-dimensional fractional images, and may be moved to allow a player to view the three-dimensional fractional images. With the moveable three-dimensional section in one position, the plurality of three-dimensional sections may form at least one whole, integrated three-dimensional image. The gaming device may further include an actuator and controller for moving the moveable three-dimensional section. A method for playing a game using a moveable three-dimensional section to provide an integrated three-dimensional image is also disclosed.

34 Claims, 20 Drawing Sheets

U.S. PATENT DOCUMENTS

| | | | | | |
|---|---|---|---|---|---|
| 5,074,559 | A | * | 12/1991 | Okada | 463/21 |
| 5,154,420 | A | * | 10/1992 | Gutknecht | 463/17 |
| 5,209,477 | A | * | 5/1993 | Heidel et al. | 273/143 R |
| 5,373,440 | A | * | 12/1994 | Cohen et al. | 705/14 |
| D354,637 | S | * | 1/1995 | Jarrett | D6/432 |
| 5,934,672 | A | * | 8/1999 | Sines et al. | 273/143 R |
| 6,113,492 | A | * | 9/2000 | Walker et al. | 463/16 |
| 6,146,273 | A | | 11/2000 | Olsen | |
| 6,217,023 | B1 | * | 4/2001 | Kremer | 273/153 R |
| 6,334,814 | B1 | * | 1/2002 | Adams | 463/20 |
| 2004/0077402 | A1 | * | 4/2004 | Schlottmann | 463/20 |

FOREIGN PATENT DOCUMENTS

GB 2186412 A * 8/1987

* cited by examiner

IMAGE ALIGNMENT GAMING DEVICE AND METHOD

CROSS REFERENCE TO RELATED AND CO-PENDING APPLICATIONS

The present patent application claims priority to U.S. provisional patent application having Ser. No. 60/503,325, filed Sep. 15, 2003. The present application further is a continuation in part of U.S. patent application Ser. No. 09/967,033, filed Sep. 28, 2001, now U.S. Pat. No. 6,719,630. The present application is also a continuation in part of U.S. patent application Ser. No. 10/664,228, filed Sep. 16, 2003, now U.S. Pat. No. 7,040,620. The present application is also a continuation in part of U.S. patent application Ser. No. 10/245,623, filed Sep. 16, 2002. That application is a continuation in part of U.S. patent application Ser. No. 09/967,055, filed Sep. 28, 2001, now U.S. Pat. No. 6,814,665, which claims priority of U.S. provisional application Ser. No. 60/241,384, filed Oct. 17, 2000. Each of the aforementioned applications is hereby expressly incorporated by reference into the present application in their entirety.

BACKGROUND OF THE INVENTION

1. Field of Invention

This invention relates to gaming devices and, more particularly, to a gaming device that adds to player excitement and satisfaction.

2. Description of Related Art

Many types of slot and video gaming machines have been designed over the years. The traditional slot machine has a series of annular reels disposed in side-by-side relationship that rotate separately about a common axis. The reels can be implemented mechanically or visually on a video display driven by a computer. The game players score or winnings are indicated by indicia on the peripheral surfaces of the reels, which may align in any of a number of different combinations following a period of rotation of the reels. Players of gaming apparatus typically find it enjoyable to have a variety of different forms of gaming apparatus available. For this purpose, slot machines of the spinning reel type have been provided with a variety of different graphics, shapes, sound effects and scoring systems. Gaming machines that are more interesting generate more player excitement and in turn are played longer resulting in more revenue for the game operator.

Unfortunately, the similarity of slot machines poses a problem for slot machine manufacturers in differentiating their machines from competitors. Modifying slot machines to enhance player enjoyment are not beneficial if the basic geometry and function of the visual components of the machine is retained.

A current unmet need exists for a gaming device that is different than previous slot machines in order to provide game players with a more exciting and desirable gaming experience.

SUMMARY OF INVENTION

Summary of at Least One Embodiment of the Invention

Advantages of One or More Embodiments of the Present Invention

The various embodiments of the present invention may, but do not necessarily, achieve one or more of the following advantages:

provide a gaming device that adds to player excitement and satisfaction;

provide a gaming device that is interesting to a player and results in longer playing time;

provide a gaming device that is readily distinguishable from conventional slot machines;

provide a gaming device that awards a prize when several fractional images are assembled into a complete image;

provide a gaming device that generates a number of times that a game is to be played;

provide a gaming device that generates a cumulative prize from each game that is played;

provide a gaming device that generates a multiplier, the multiplier being multiplied times the cumulative prize to obtain a total prize that is awarded;

provide a gaming device that uses three dimensional objects;

provide a gaming device that uses fractional images;

provide a gaming device that aligns fractional images to form whole images; and provide a gaming device that aligns three dimensional fractional images to form a three dimensional whole image.

These and other advantages may be realized by reference to the remaining portions of the specification, claims, and abstract.

Brief Description of at Least One Embodiment of the Present Invention

In one embodiment, the present invention is directed to a gaming device comprising a three-dimensional figure. The three dimensional figure comprises a plurality of three-dimensional sections, each having a height, a width, and a depth. At least one three-dimensional section is moveable relative to the other three dimensional sections and comprises a plurality of three-dimensional fractional images. The moveable three-dimensional section may be positionable to allow a player to view the plurality of three-dimensional fractional images by moving the three-dimensional section. When the moveable three-dimensional section is in at least one position, the plurality of three-dimensional sections form at least one whole, integrated three-dimensional image. The gaming device also comprises an actuator attached to the moveable three-dimensional section and configured to move the moveable three-dimensional section. The gaming device also includes a controller in communication with the actuator and configured to cause the actuator to move the moveable three-dimensional section.

In another embodiment, the present invention is directed to a method of playing a game. A player is allowed to place a wager on a game. At least a first moveable three-dimensional section is moved. The moveable three-dimensional section comprises a plurality of fractional three-dimensional images. A game outcome is randomly determined. At least one of the fractional three-dimensional images is selected to at least partially convey the outcome of the game to the player. The selected fractional image is positioned next to at least a second fractional image so that the player may see the selected fractional three-dimensional image. The player is awarded a prize if the selected fractional image and at least the second fractional image form a predefined, unitary image.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF AT LEAST ONE EMBODIMENT OF THE INVENTION

In the following detailed description of certain embodiments of the invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Gaming Device

Figure 1:
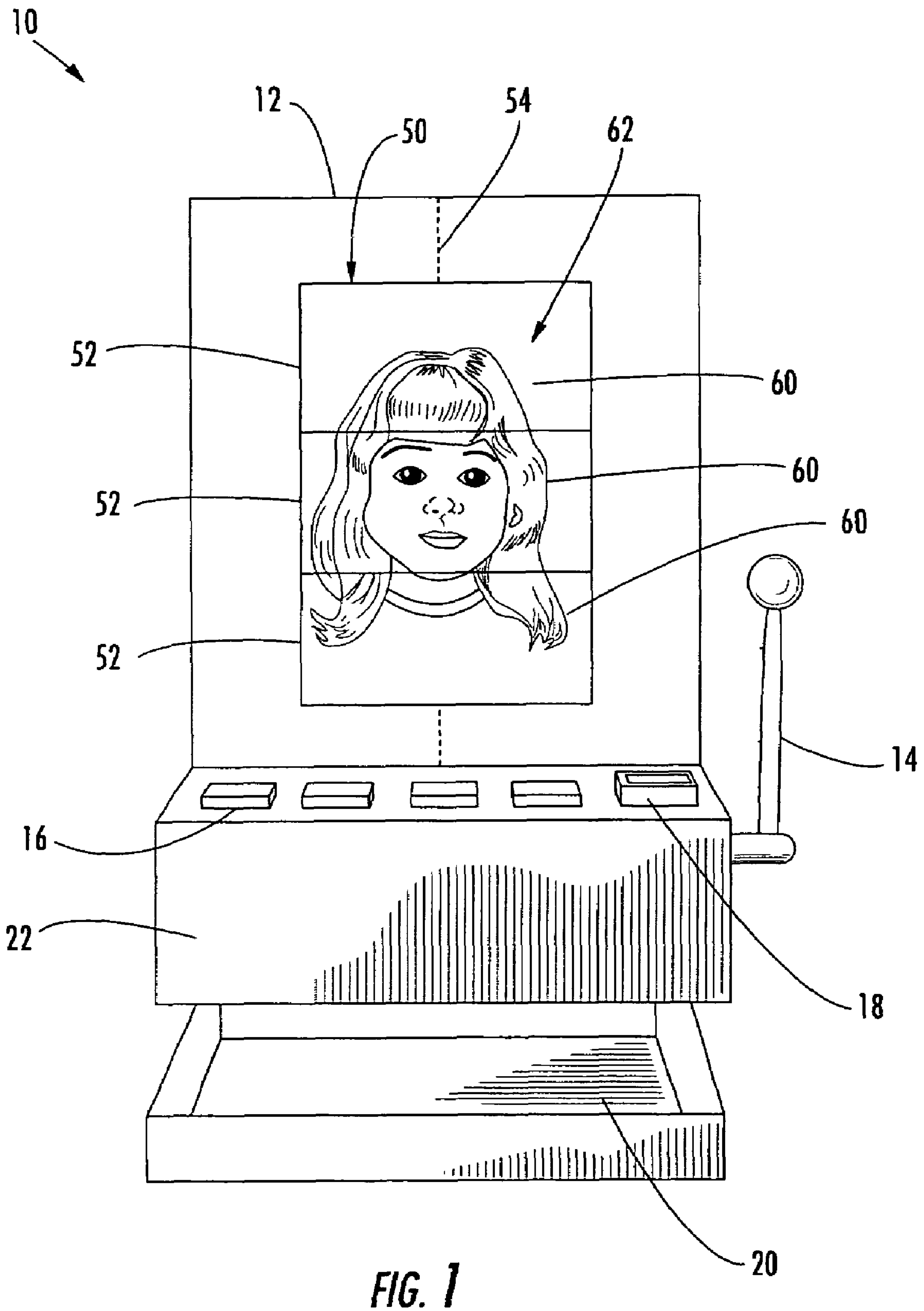
FIG. 1 is substantially a front view of a gaming device in accordance with the present invention in which the image displayed is a whole image.
Figure 2:
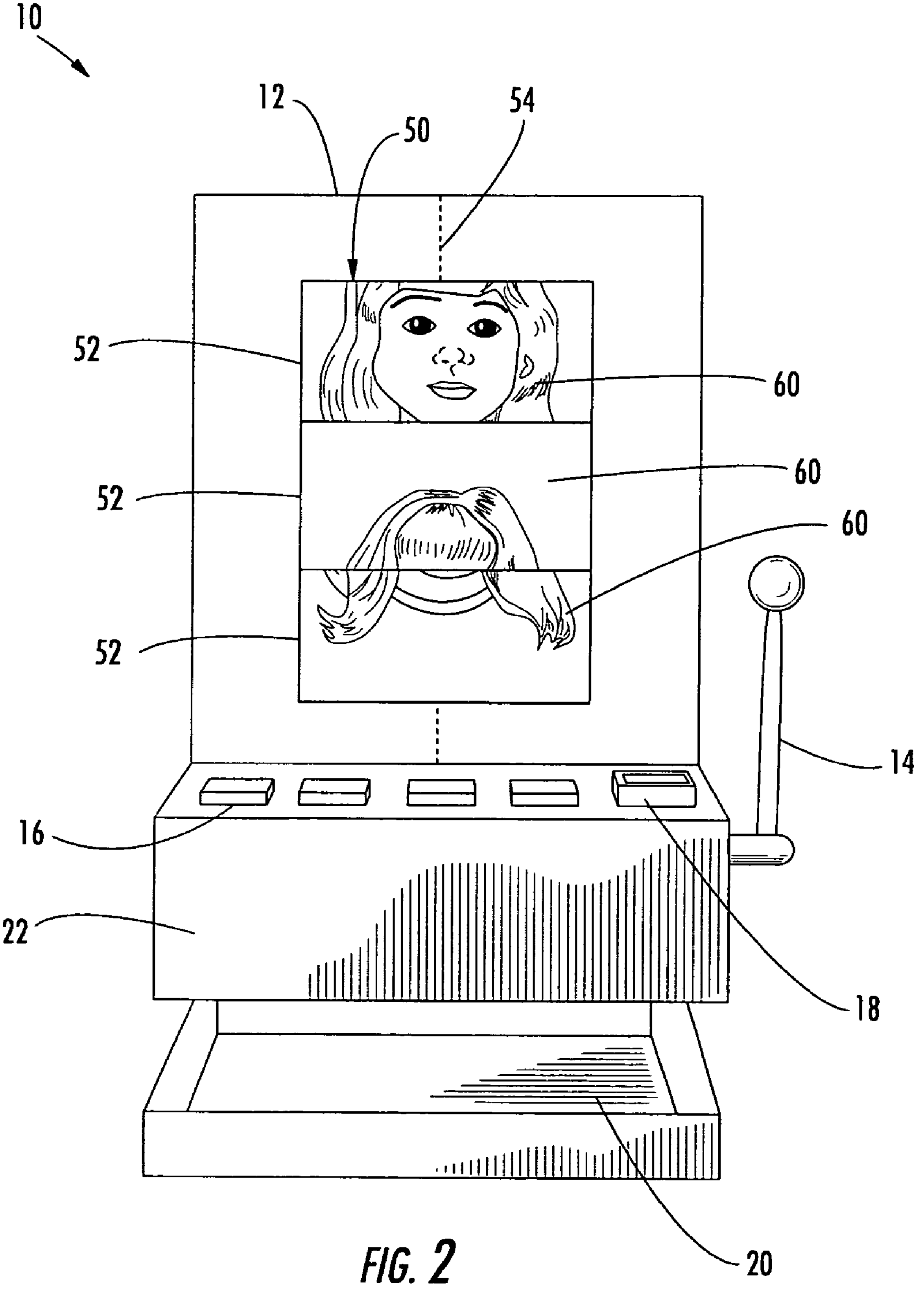
FIG. 2 is substantially a front view of the gaming device of FIG. 1 in which the image is not aligned.

Referring to FIGS. 1 and 2, a gaming device 10 is shown. Gaming device 10 comprises a housing (or case) 12, a game display 50 having several display sections 52, a lever 14, selector buttons 16, a value acceptor 18, a coin bin 20 and a game controller 22 (generically represented) adapted to control a plurality of fractional images 60 displayed in the display sections 52. The fractional images 60 form a whole or complete image 62.

Case 12 contains the gaming device components. Value acceptor 18 accepts value, such as currency or currency equivalents, from a game player (not shown). Value acceptor 18 can also accept tokens, paper currency and vouchers. The coin bin 20, mounted below the case, holds coins that may be dispensed after a winning game event has occurred. Lever 14 may be used by the game player to initiate play on gaming device 10. Lever 14 may be pulled by the game player to start the game.

Display 50 has three display sections 52. Display 50 can be mechanical spinning reels or display 50 can be a video display that simulates mechanical spinning reels or display 50 can be other means to display an image, such as a video display. While display 50 is shown with three display sections 52, more or less sections could be used. For example, a 3×3 matrix of 9 display sections could be used. It is noted that the display sections 52 are shown oriented or aligned vertically, however other orientations or alignments can be used. As shown, axis of rotation 54 of the reels is vertical. The game player stands or sits upright facing the display 50. The axis of rotation 54 is parallel to the game player, although other rotational axes may be used. Each of the display sections 52 may contain a fractional image 60. The fractional image 60 is a portion of a whole or complete image 62. The image 62 can be a wide variety of interesting subjects such as pictures or paintings including movie stars, celebrities, famous landmarks, musicians, vehicles, buildings, politicians, etc. The whole image 62 is a contiguous recognizable image. If desired a payline (not shown) can be added to the display 50 to aid the player in seeing the alignment of the fractional images 60.

The whole image 62 is broken up into fractional images 60. In FIG. 1, the whole image 62 has been broken into 3 fractional images 60. If desired, whole image 62 could be broken into fewer or more fractional images 60. The game controller 22 controls the displaying of the fractional images 60. Game controller 22 contains a random number generator to cause the display sections 52, e.g. mechanical reels or video display, to generate a particular combination of fractional images 60.

During game play, a game player inserts value into value acceptor 18, places a wager, and then pulls lever 14 or otherwise starts game play. If display 50 includes mechanical reels, the reels spin or rotate about axis 54. Several of the fractional images 60 may be placed on a circumference of the reels. The fractional images 60 move horizontally with respect the player viewing the display 50. As discussed above, the fractional images 60 could move vertically, diagonally, or a combination thereof, or in other ways. The game controller 22 selects a particular fractional image 60 to stop at or display in each display section 52. The selector buttons 16 may be used to tell the controller 22 when to stop the rotating reels. In the case that display 50 is a video display, the video display simulates the mechanical reels and game controller 22 selects a particular fractional image 60 to stop at or display in each display section 52. In FIG. 1, the fractional images 60 line up to form a complete or whole image 62. In this example, the whole image 62 is a girl's face. In FIG. 2, the fractional images 60 do not line up to form a complete or whole image 62.

When the display sections 52 form a complete or whole image 62, a game-winning event is generated and the player is dispensed a payout in accordance with a payout table (not shown). When the display sections 52 do not form a complete or whole image 62, a game-losing event is generated and the player add more value or use accumulated credits to play again. If desired, the payout table can be structured to make a partial payout depending upon the number of fractional images 60 that are properly aligned. For example, if 2 of the 3 fractional images 60 are properly aligned, the payout could be 50 percent of the payout for having all 3 of the fractional images 60 properly aligned. Alternatively, many different prize events may be present in the game, some of which require aligning at least a portion of the fractional images.

In the case where display 50 has multiple spinning reels to form a matrix of display sections 52, the complete image 62 may be formed along a row, column, or diagonal of the matrix, a portion of the matrix, or can be formed by having all of the display sections 52 show the complete image.

Flowchart

Figure 3:
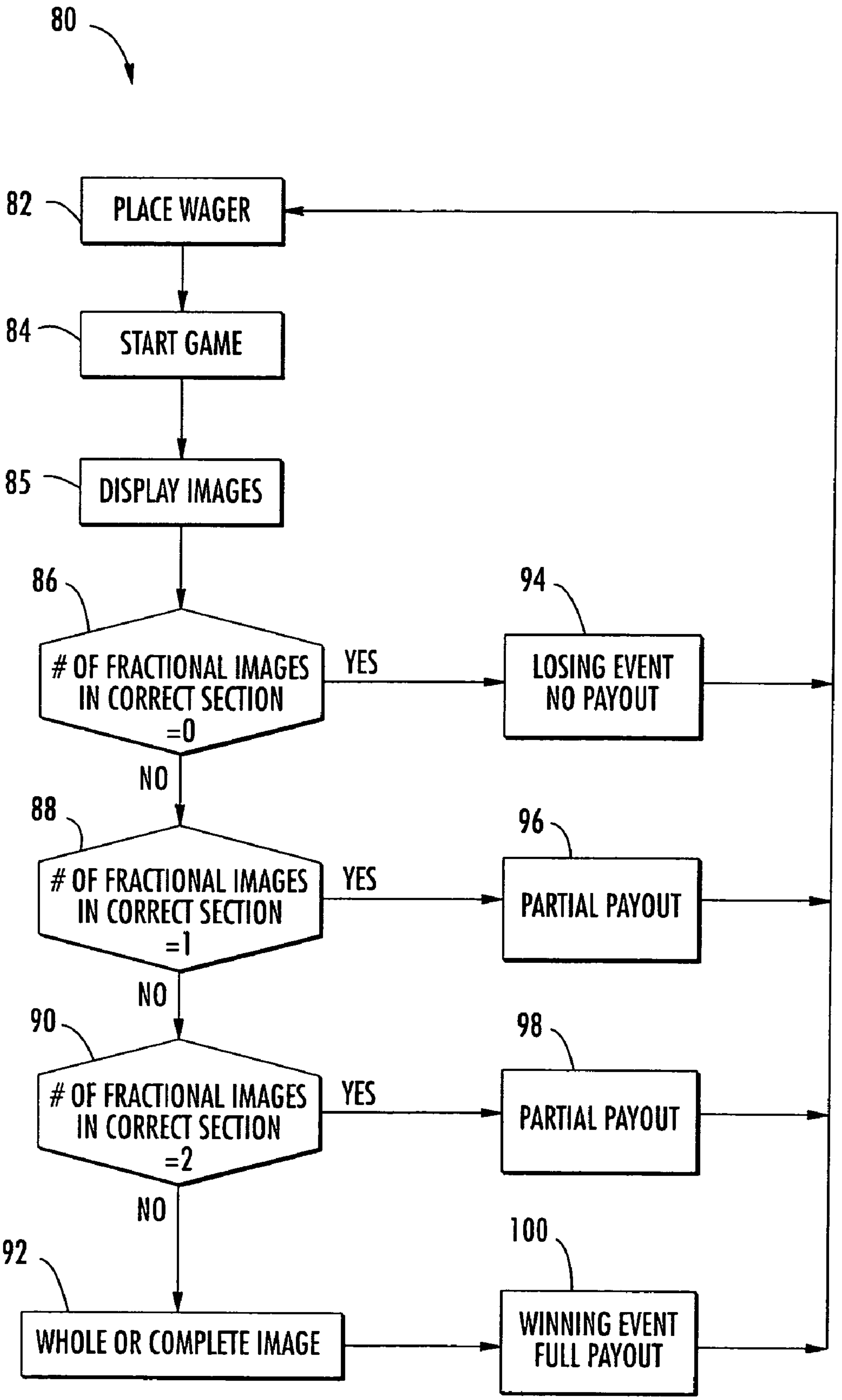
FIG. 3 is substantially a flow chart showing the operation of the gaming device of FIG. 1.

Referring to FIG. 3, a flowchart 80 is shown. Flowchart 80 depicts the steps followed in playing a game on gaming device 10 (See FIG. 1). A wager is placed by the game player at step 82 in order to start game play on gaming device 10. At step 84, the player pulls lever 14, or otherwise starts the game. At step 85, the game controller 22 determines which fractional images 60 are to be displayed in each display section 52 and displays those fractional images 60. Game controller 22 randomly selects the fractional image 60 to be displayed in each display section 52. Next, gaming device 10 moves to a decision step 86. At decision step 86, the number of fractional images 60 that are aligned in the correct location or display section 52 are determined. If the number of correctly aligned images 60 is equal to zero, a yes is returned and the game progresses to step 94 where a losing event is determined along with no pay out of an award. From step 94, the game loops back to step 82 to allow the game player to place another wager. If a no is returned at decision step 86, the game moves to decision step 88.

At decision step 88, the number of fractional images 60 that are aligned in the correct location or display section 52 is compared to see if they are equal to one. In the case where the answer is "yes" at step 88, the game progresses to step 96 where a payout is determined according to a redefined pay table and paid. For example, if a wager of one dollar was placed, the payout for correctly aligning one of the three images 60 could be 50 cents. From step 96, the game loops back to step 82 to allow the game player to place another wager. If a no is returned at decision step 88, the game moves to decision step 90.

At decision step 90, the number of fractional images 60 that are aligned in the correct location or display section 52 is compared to see if they are equal to two. In the case where a yes is returned at step 90, the game progresses to step 98 where a partial payout is determined and paid. For example, if a wager of one dollar was placed, the payout for correctly aligning two of the three images 60 could be one dollar. From step 98, the game loops back to step 82 to allow the game player to place another wager. If a no is returned at decision step 90, the game moves to step 92.

At step 92, the number of fractional images 60 that are aligned in the correct location or display section 52 is equal to three. The game next moves to step 100 where a full payout is determined and paid for a game-winning event. For example, if a wager of one dollar was placed, the payout for correctly aligning all of the three images 60 could be two dollars. From step 100, the game loops back to step 82 to allow the game player to place another wager.

Bonus Game Embodiment

Figure 4:
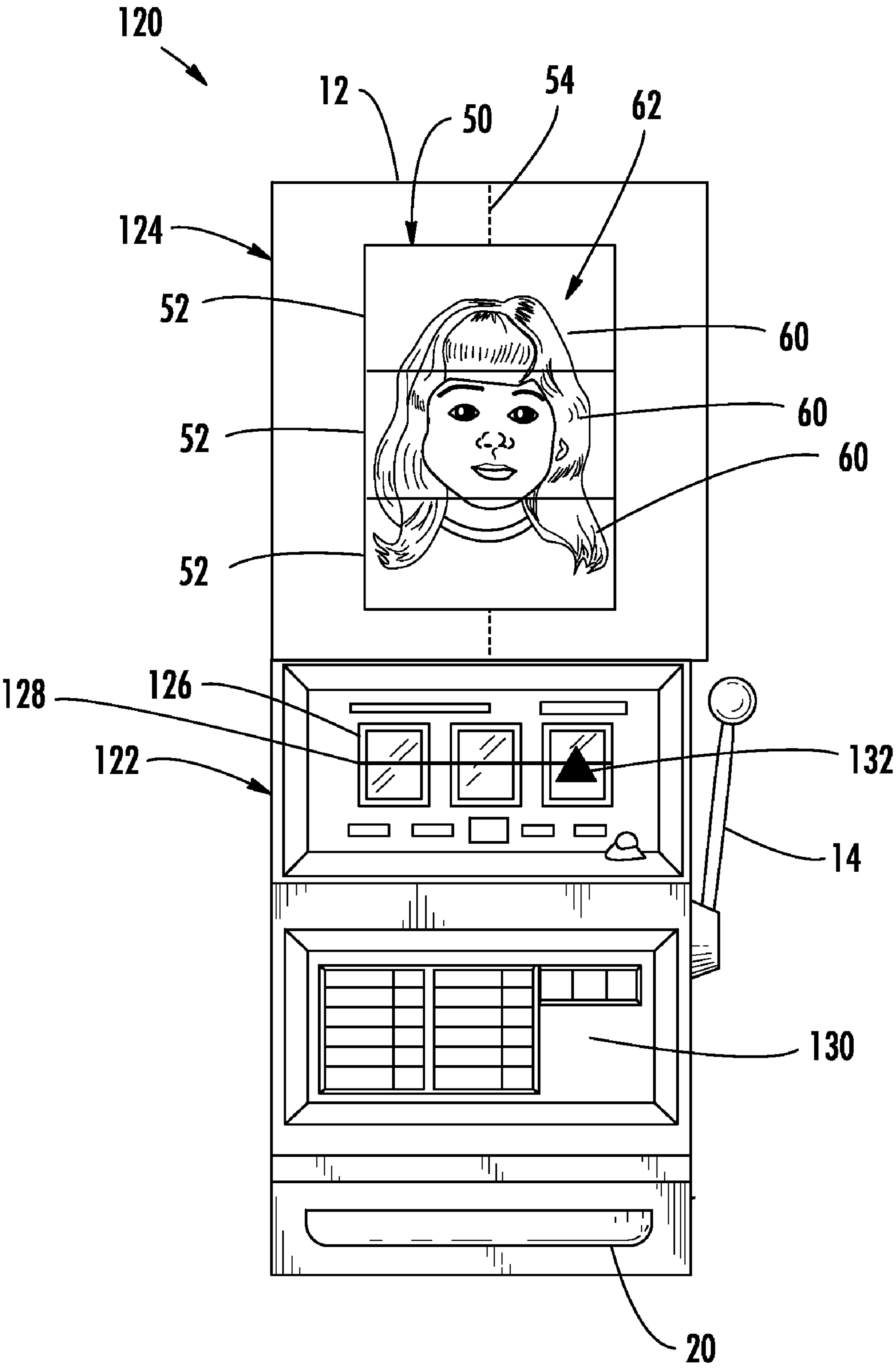
FIG. 4 is substantially a front elevational view of an alternative embodiment of a gaming device in which the present invention is used as a bonus game.

The gaming device 10 shown in FIGS. 1 and 2 is configured as a primary game. The gaming device 10 can also be used as a bonus game that is attached to another primary game. Referring to FIG. 4, a bonus gaming device 120 is shown. Bonus gaming device 120 comprises a primary game 122 and a bonus game 124 mounted on top. Primary game 122 can be almost any game. In FIG. 4, primary game 122 is shown as a conventional slot machine. Primary game 122 comprises several rotating reels 126 with a payline 128. Primary game 122 may be activated by a lever 14. One or more meters or displays 130 tell the game player their winnings and remaining playing credits. A special symbol 132 is generated on payline 128 to signify a bonus qualifying or generating event. After a bonus qualifying event has occurred, the bonus game 124 becomes available for play. Bonus game 124 would then be played in a similar manner as gaming device 10. The conventional slot machine triggers a bonus-qualifying event that allow the game player the opportunity to play bonus game 124 to win a bonus prize or payout.

Bonus Game Flowchart

Figure 5:
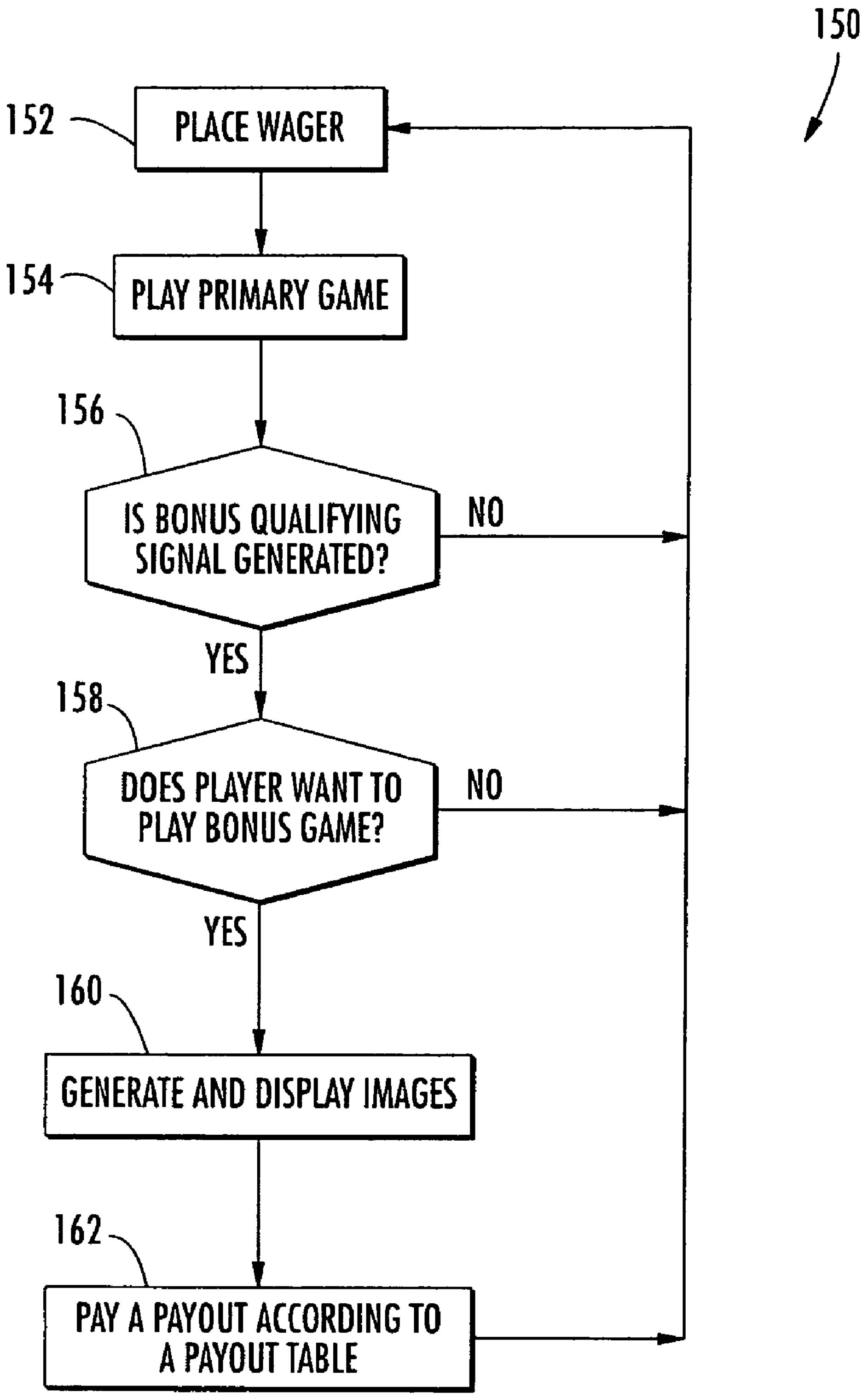
FIG. 5 is substantially a flow chart showing the operation of the bonus gaming device of FIG. 4.

Referring to FIG. 5, a flowchart 150 of the operation of bonus gaming device 120 is shown. Flowchart 150 depicts the steps followed in playing the bonus gaming device 120. A wager is placed by the game player at step 152 in order to start game play on the primary game 122. At step 154, the player plays the primary game 122. Next, the primary game 122 moves to a decision step 156. At decision step 156, the bonus gaming device 120 checks to see if the bonus-qualifying event has occurred. If the bonus-qualifying event has not occurred, the game loops back to step 152 to allow the player the opportunity to place another wager and play the primary game 122 again. If the bonus-qualifying event has occurred at step 156, the method continues to decision step 158. At decision step 158, the player may elect to play the bonus game 124 or return to the primary game 122. If the player elects to return to the primary game 122, the game loops back to step 152. If the player elects to play the bonus game 124, the game play proceeds to step 160. At step 160, the player plays the bonus game 124, the game controller 22 determines which fractional images 60 are to be displayed in each display section 52 and displays those fractional images 60. The operation at this point of the bonus game 124 is identical to that of gaming device 10 of FIGS. 1 and 2. At step 162, the game player is then paid a payout depending upon the number of images 60 that are correctly aligned to correspond with the whole image 62. The game then loops back to step 152 to allow the player to play the primary game 122 again.

Alternative Embodiment

Figure 6:
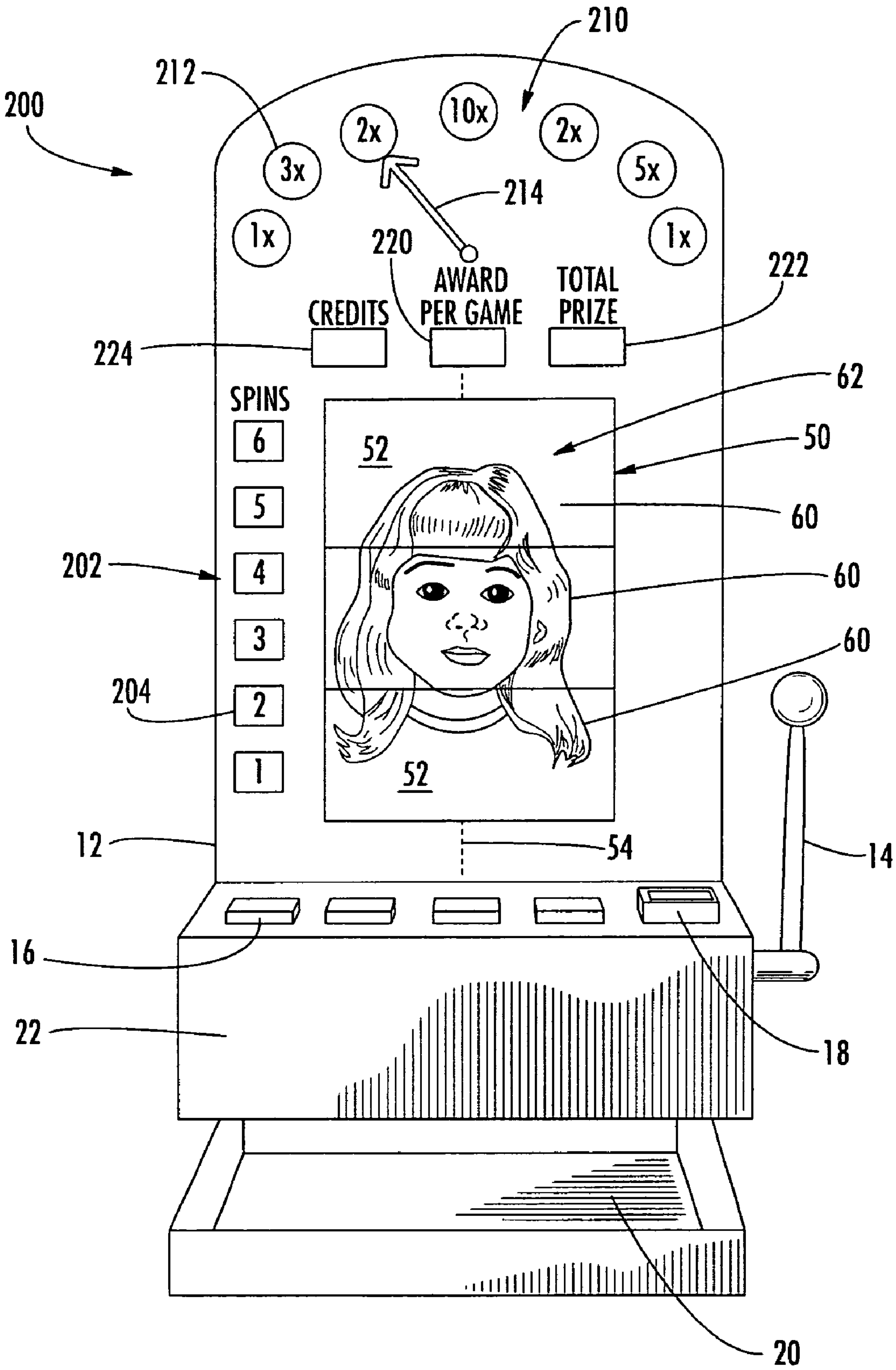
FIG. 6 is substantially a front view of an alternative embodiment of a gaming device in accordance with the present invention.

Referring to FIG. 6, an alternative embodiment of a gaming device 200 is shown. Gaming device 200 is similar to gaming device 10 of FIG. 1 with the addition of a spin or game play meter 202 and a multiplier meter 210. Gaming device 200 comprises the housing (or case) 12, game play meter 202, multiplier meter 210, game display 50 having at least one display section 52, lever 14, selector buttons 16, value acceptor 18, coin bin 20 and game controller 22 adapted to control the plurality of fractional images 60 displayed in the display sections 52. The fractional images 60 form whole or complete image 62.

Game play meter 202 has several spin indicators 204 labeled 1 through 6 spins that are aligned vertically. Game play meter 202 may be shown as a voltage meter for example. Meter 202 is in communication with game controller 22. The spin indicator 204 displays the number of times selected by game controller 22 that the game is to be played or repeated for one wager. Spin indicator 204 displays a randomly generated integer for the number of times that the game is to be played. For example, if gaming device 200 selects three (3) times to play the game, indicator 204 would light up or other wise indicate that three plays or spins of display 50 would occur. The spins may occur sequentially without the need for the game player to pull lever 14 or otherwise provide input. An award for each game is generated in the same manner as in gaming device 10. That is, when a whole image 62 is formed, a prize or award is generated. The award from each game is added to obtain a cumulative award or prize. The cumulative award or prize is displayed on meter 220. If no award or prize is won in any of the spins, a consolation prize may be generated by game controller 22 and awarded.

Multiplier meter 210 may be located at the top of case 12. Multiplier meter 210 selects and displays a multiplier that the cumulative award or prize is to be multiplied by to obtain a total prize that is then awarded to the game player. Multiplier meter 210 may have several multiplier indicators 212 and an arrow 214. Multiplier meter 210 is in communication with game controller 22. Game controller 22 randomly selects a multiplier. Arrow 214 points to the multiplier indicator 212 selected by game controller 22. Arrow 214 may be a mechanical arrow that is rotated or can be one of several arrows that light up to point to the selected multiplier indicator 212. The selected multiplier multiplies the cumulative award shown on meter 220 to obtain a total prize that is then paid to the player. The total prize is shown on total prize meter 222. The total prize is added to the game player's credit meter 224.

Gaming device 200 is shown as a primary game in FIG. 6. Gaming device 200 could also be used as a bonus game. In the case where gaming device 200 is used as a bonus game, it would replace bonus game 124 in FIG. 4. Gaming device 200 would be mounted on top of primary game 122 (FIG. 4).

Alternative Embodiment Flowchart

Figure 8:
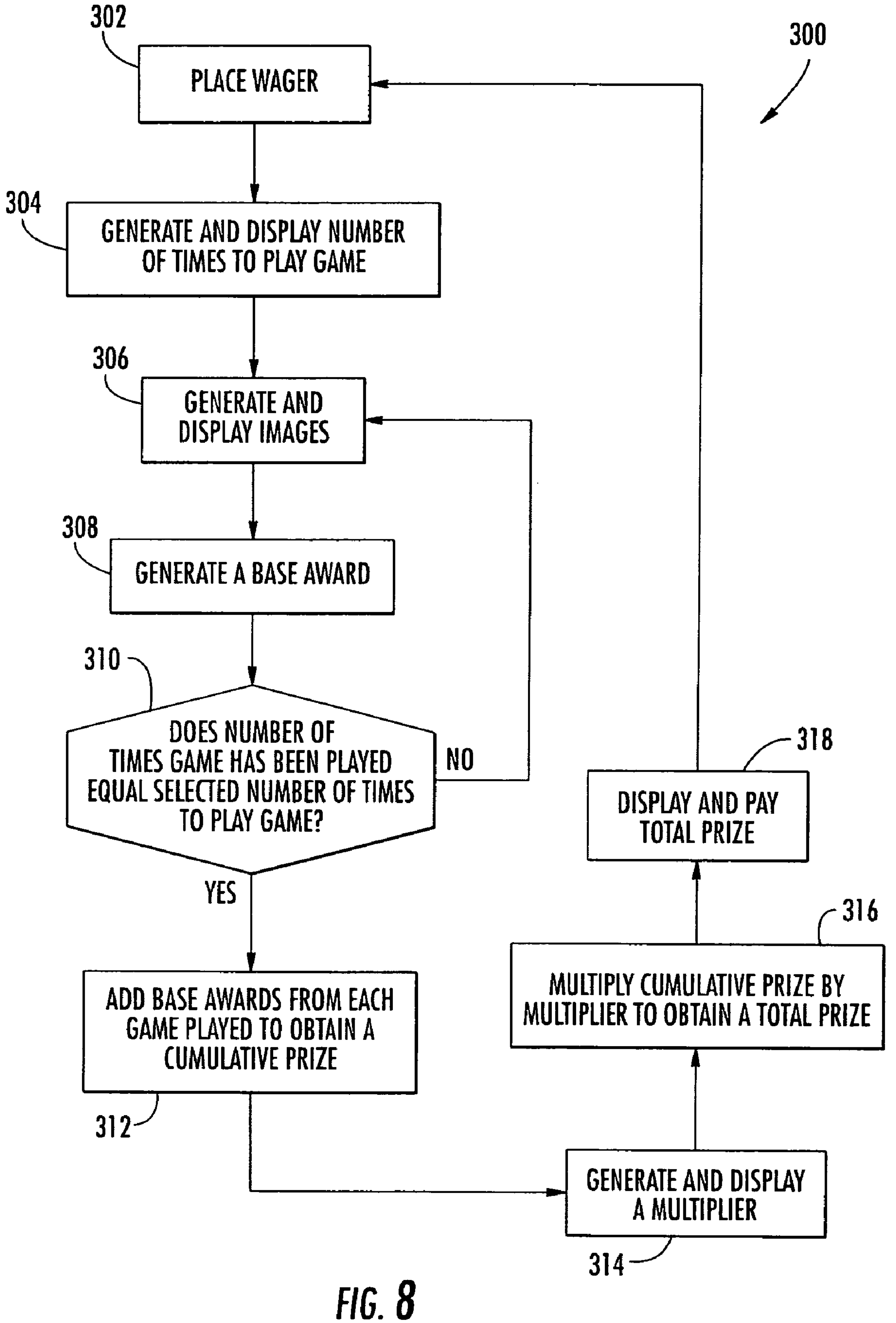
FIG. 8 is substantially a flow chart showing the operation of the gaming device of FIG. 6.

Referring to FIG. 8, a flowchart 300 is shown. Flowchart 300 depicts the steps followed in playing a game on gaming device 200 (See FIG. 6). A wager is placed by the game player at step 302 in order to start game play on gaming device 200. At step 304, game controller 22 randomly selects a number of times to play a game on gaming device 200. The number of games is displayed on game play meter 202. At step 306, the game controller 22 determines which fractional images 60 are to be displayed in each display section 52 and displays those images 60. Game controller 22 randomly selects the fractional image 60 to be displayed in each display section 52. At step 308, a base award is generated depending upon the number of images 60 that are correctly aligned to correspond to the whole image 62. The game then proceeds to decision step 310 where the number of games played is compared to the selected number of times to play gaming device 200. If the number of times that gaming device 200 has been played is not equal to the selected number of times, the game loops back to step 306 where the images 60 are generated and displayed again. If the number of times that gaming device 200 has been played is equal to the selected number of times, the game proceeds to step 312. At step 312 the award from each individual game played is added to obtain a cumulative prize. The cumulative prize is displayed on meter 220.

Next, the game proceeds to step 314 where game controller 22 randomly selects a multiplier. The multiplier is shown on multiplier meter 210. At step 316, the multiplier multiplies the cumulative prize to obtain a total prize. The total prize is shown on total prize meter 222. Next, at step 318 the total prize is displayed and paid. The game then returns to step 302 where the game player is allowed to place another wager and play again.

Alternative Bonus Embodiment Flowchart

Figure 9:
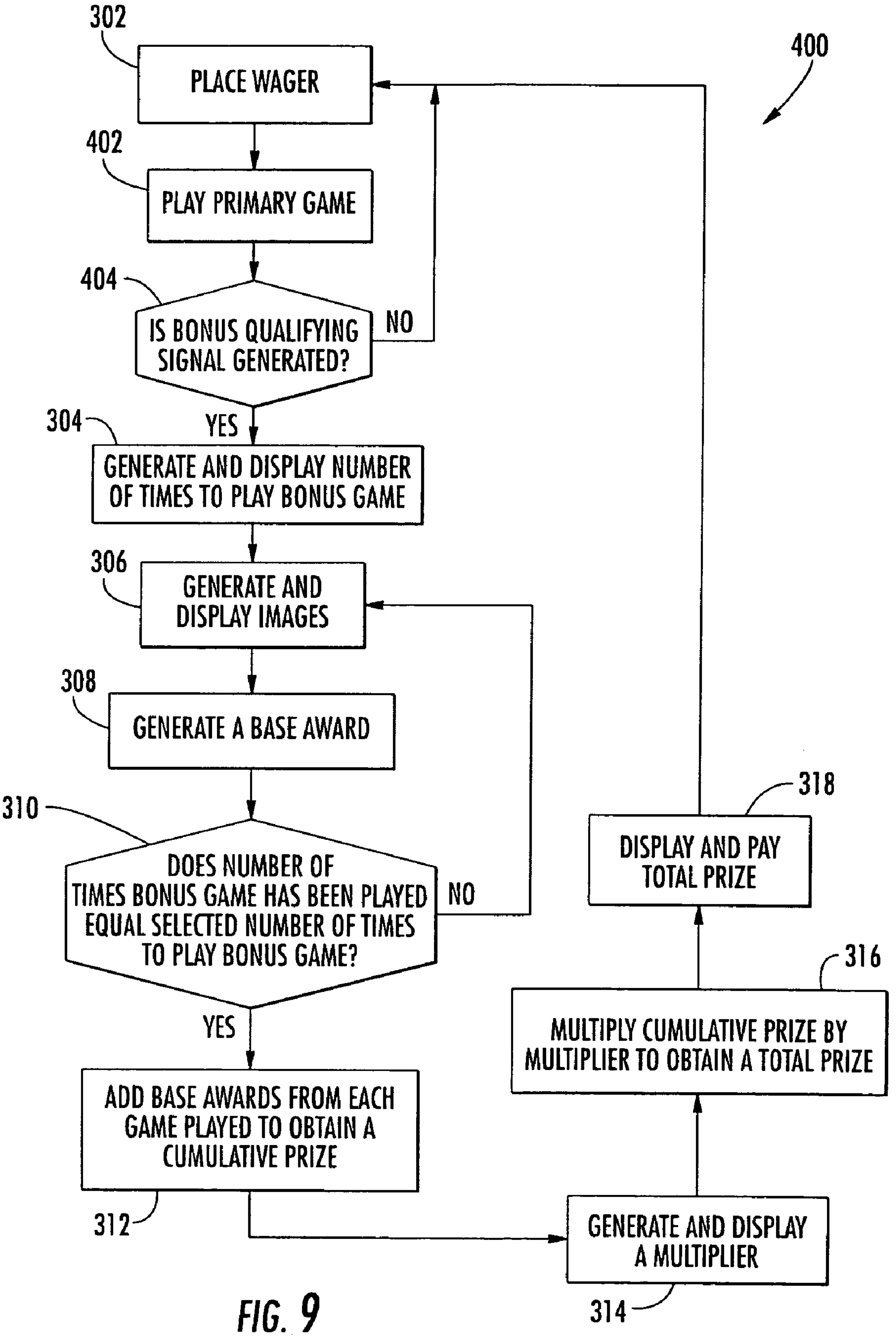
FIG. 9 is substantially a flow chart showing the operation of the gaming device of FIG. 6 when used as a bonus game in conjunction with a primary game.

Referring to FIG. 9, a flowchart 400 is shown. Flowchart 400 depicts the steps followed in playing a game on gaming device 200 when it is used as a bonus game in conjunction with primary game 122 (FIG. 4). A wager is placed by the game player at step 302 in order to start game play on primary game 122. At step 402, the game player plays primary game 122. Next, at decision step 404, the game checks to see if a bonus-qualifying event has occurred. If the bonus-qualifying event has not occurred, the game loops back to step 302 to allow the player the opportunity to place another wager and play the primary game 122 again. If the bonus-qualifying event has occurred at step 404, the method continues to step 304 to allow the player to play the bonus game.

At step 304, game controller 22 randomly selects a number of times to play a game on gaming device 200. The number of games is displayed on meter 202. At step 306, the game controller 22 determines which fractional images 60 are to be displayed in each display section 52 and displays those images 60. Game controller 22 randomly selects the image 60 to be displayed in each display section 52. At step 308, a base award is generated depending upon the number of fractional images 60 that are correctly aligned to correspond with the whole image 62. The game then proceeds to decision step 310 where the number of times the game has been played is compared to the selected number of times to play gaming device 200.

If the number of times that gaming device 200 has been played is not equal to the selected number of times, the game loops back to step 306 where the images 60 are generated and displayed again. If the number of times that gaming device 200 has been played is equal to the selected number of times, the game proceeds to step 312. At step 312, the award from each individual game played is added to obtain a cumulative prize. The cumulative prize is displayed on meter 220.

Next, the game proceeds to step 314 where game controller 22 randomly selects a multiplier. The multiplier is shown on multiplier meter 210. At step 316, the multiplier multiplies the cumulative prize to obtain a total prize. The total prize is shown on total prize meter 222. Next, at step 318 the total prize is displayed and paid. The game then returns to step 302 where the game player is allowed to place another wager and play primary game 122 again.

Second Alternative Embodiment

Figure 7:
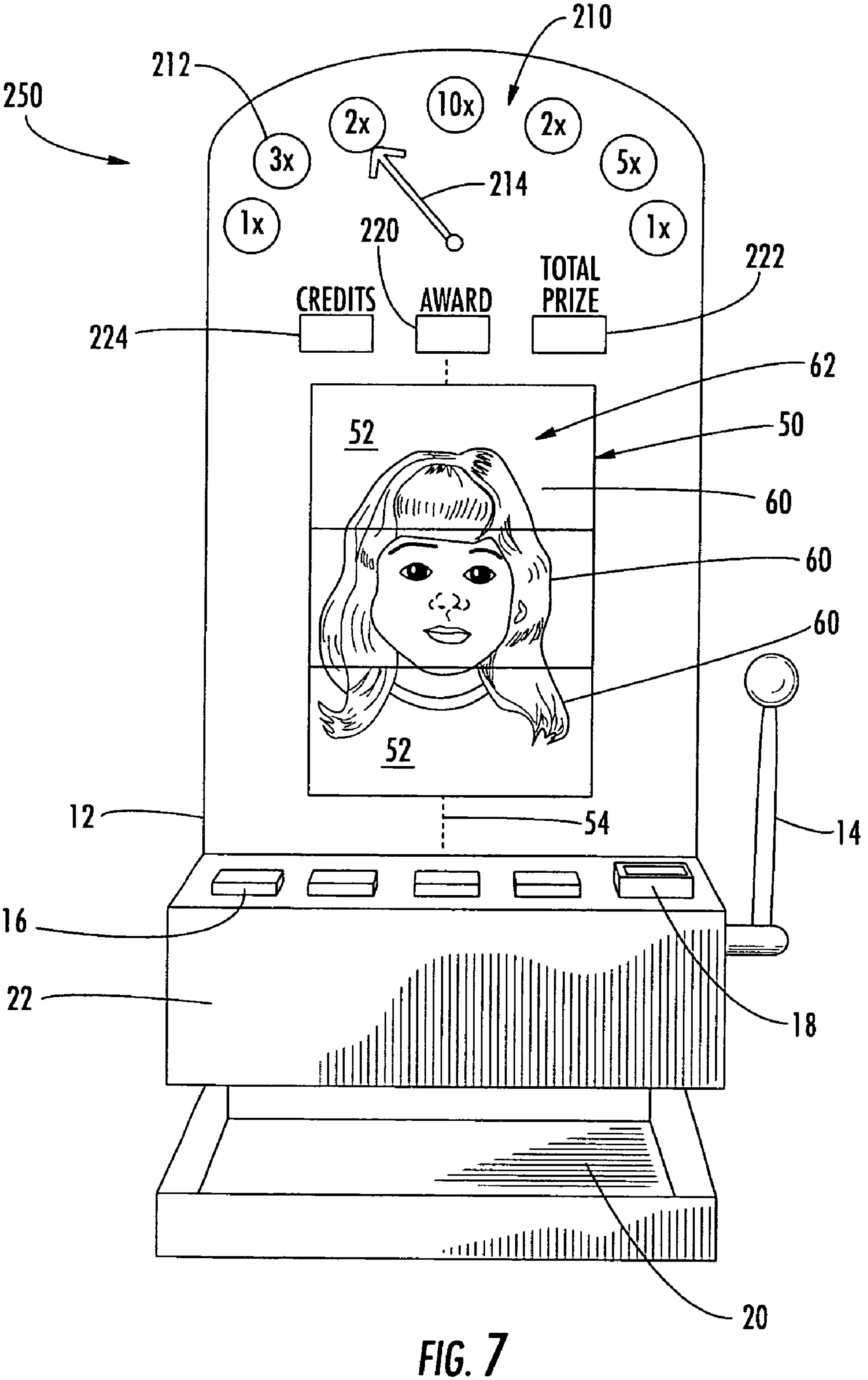
FIG. 7 is substantially a front view of another embodiment of a gaming device.

Referring now to FIG. 7, an alternative embodiment of a gaming device 250 is shown. Gaming device 250 is similar to gaming device 200 of FIG. 6 except that spin or game meter 202 is not present. Gaming device 250 similarly comprises housing (or case) 12, multiplier meter 210, game display 50 having several display sections 52, lever 14, selector buttons 16, value acceptor 18, coin bin 20 and game controller 22 adapted to control the plurality of fractional images 60 displayed in the display sections 52. The fractional images 60 form whole or complete image 62.

Multiplier meter 210 is located at the top of case 12. Multiplier meter 210 selects and displays a multiplier that the award or prize in the game is to be multiplied by to obtain a total prize that is then awarded to the game player. Multiplier meter 210 may have several multiplier indicators 212 and an arrow 214. Multiplier meter 210 is in communication with game controller 22. Game controller 22 randomly selects a multiplier. Arrow 214 points to the multiplier indicator 212 selected by game controller 22. Arrow 214 may be a mechanical arrow that is rotated or can be one of several arrows that light up to point to the selected multiplier. The selected multiplier multiplies award meter 220 to obtain a total prize that is then paid to the player. The total prize is shown on total prize meter 222. The total prize is added to the game player's credit meter 224.

Gaming device 250 is shown as a primary game in FIG. 7. Gaming device 250 could also be used as a bonus game. In the case where gaming device 250 is used as a bonus game, it would replace bonus game 124 in FIG. 4. Gaming device 250 would be mounted on top of primary game 122 (FIG. 4).

Second Alternative Embodiment Flowchart

Figure 10:
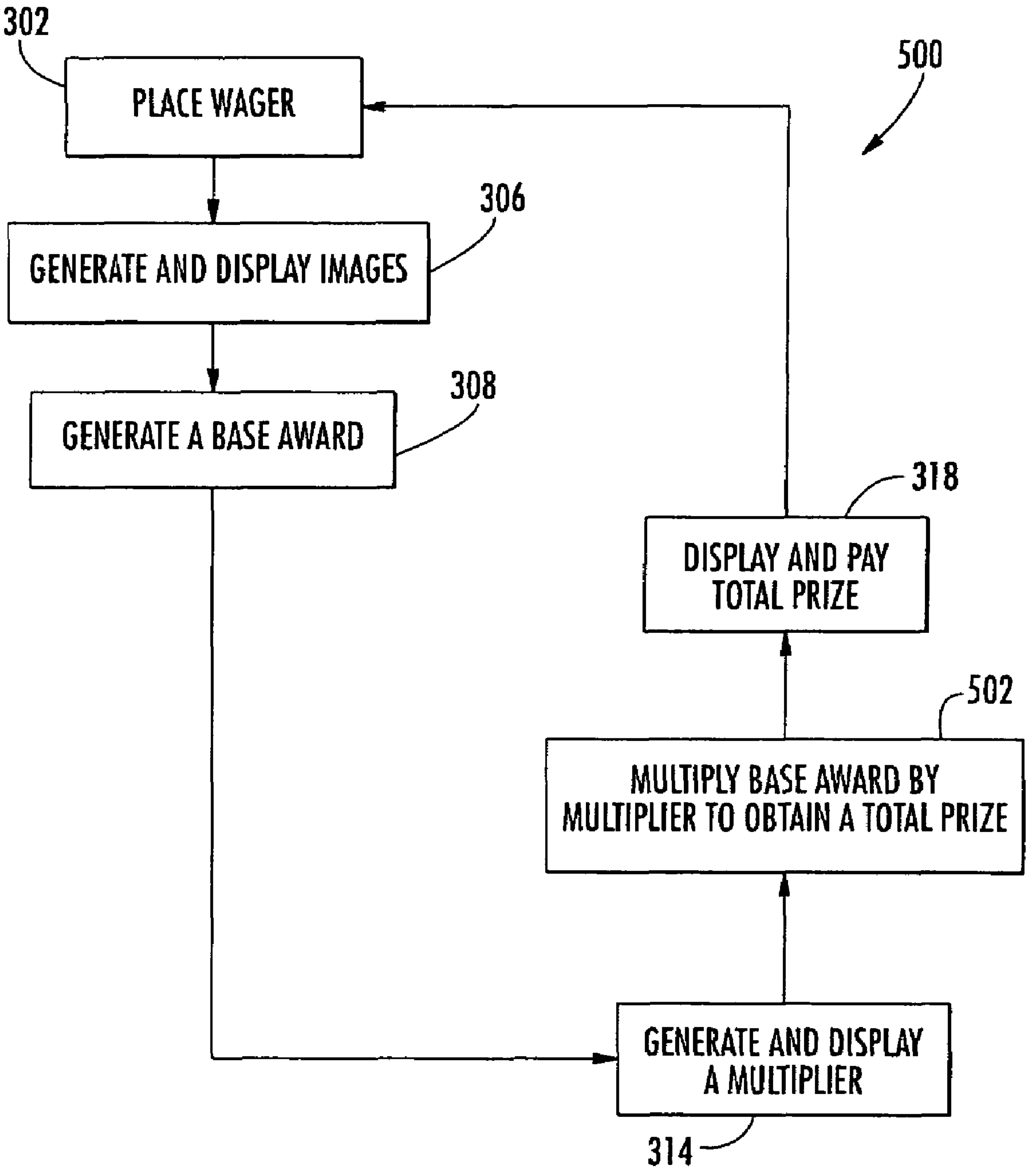
FIG. 10 is substantially a flow chart showing the operation of the gaming device of FIG. 7.

Referring to FIG. 10, a flowchart 500 is shown. Flowchart 500 depicts the steps followed in playing a game on gaming device 250. A wager is placed by the game player at step 302 in order to start game play on gaming device 250. At step 306, gaming device 250 generates and displays fractional images 60. Game controller 22 randomly selects the fractional image 60 to be displayed in each display section 52. At step 308, a base award is generated depending upon the number of images 60 that are correctly aligned. The game then proceeds to step 314 where game controller 22 randomly selects a multiplier. The multiplier is shown on multiplier meter 210. At step 502, the multiplier multiplies the base award or prize to obtain a total prize. The total prize is shown on total prize meter 222. Next, at step 318 the total prize is displayed and paid. The game then returns to step 302 where the game player is allowed to place another wager and play again.

Second Alternative Bonus Embodiment Flowchart

Figure 11:
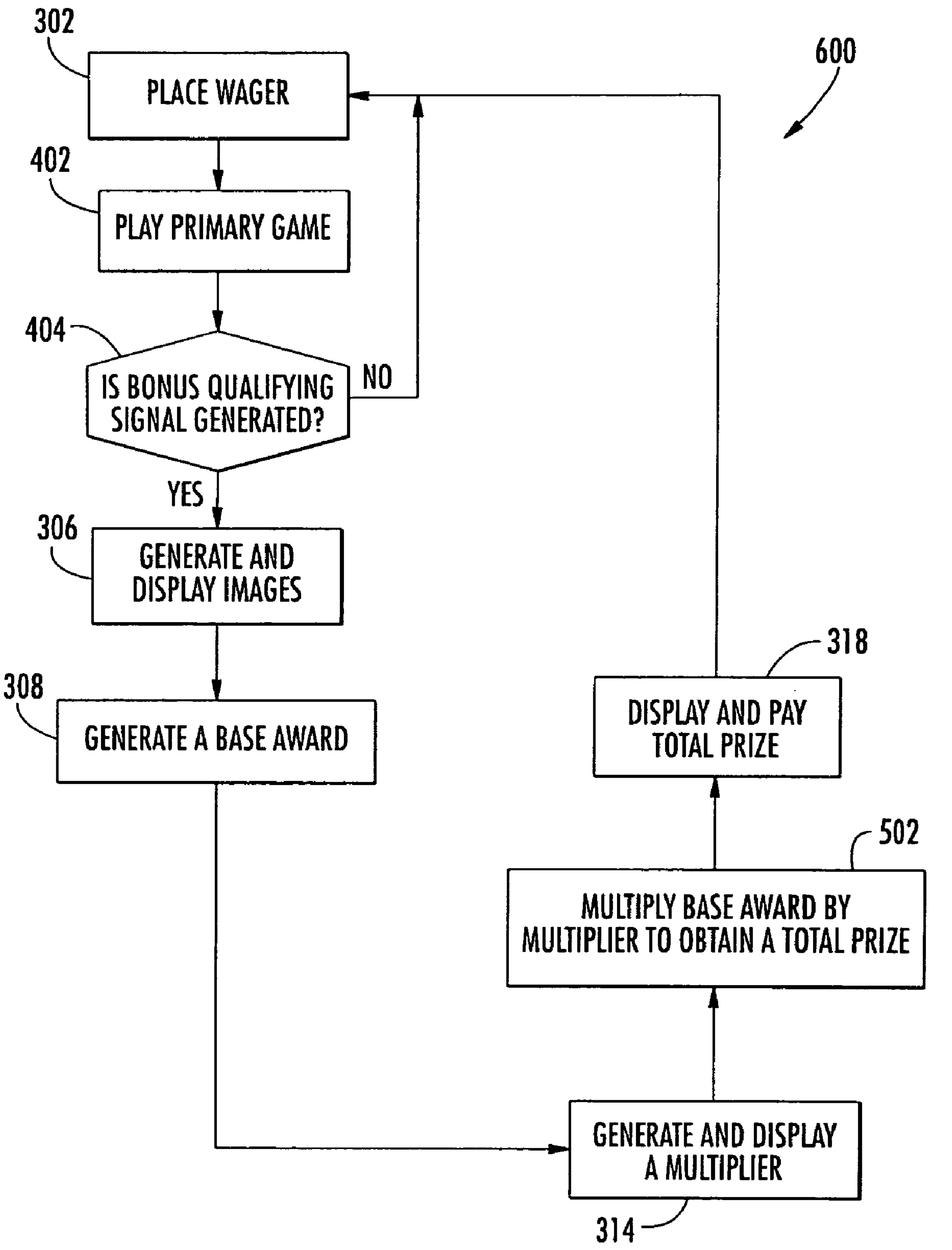
FIG. 11 is substantially a flow chart showing the operation of the gaming device of FIG. 7 when used as a bonus game in conjunction with a primary game.

Referring to FIG. 11, a flowchart 600 is shown. Flowchart 600 depicts the steps followed in playing a game on gaming device 250 when it is used as a bonus game in conjunction with primary game 122 (See FIG. 4). A wager is placed by the game player at step 302 in order to start game play on primary game 122. At step 402, the game player plays primary game 122. Next, at decision step 404 the game checks to see if a bonus-qualifying event has occurred. If the bonus-qualifying event has not occurred, the game loops back to step 302 to allow the player the opportunity to place another wager and play the primary game 122 again. If the bonus-qualifying event has occurred at step 404, the method continues to step 306 to allow the player to play the bonus game. At step 306, the game controller 22 determines which fractional images 60 are to be displayed in each display section 52 and displays those images 60. Game controller 22 randomly selects the image 60 to be displayed in each display section 52. At step 308, a base award is generated depending upon the number of images 60 that are correctly aligned. The base award is displayed on meter 220.

Next, the game proceeds to step 314 where game controller 22 randomly selects a multiplier. The multiplier is shown on multiplier meter 210. At step 502, the multiplier multiplies the base award to obtain a total prize. The total prize is shown on total prize meter 222. Next, at step 318 the total prize is displayed and paid. The game then returns to step 302 where the game player is allowed to place another wager and play primary game 122 again.

Three-Dimensional Embodiment

Games employing three dimensional objects may be more interesting to game players, and thereby encourage more players to play the game, and for longer periods, thereby generating more revenue for gaming operators. The present invention may be implemented using three dimensional figures, creating a novel display for game players and allowing new possibilities for game design.

Three Dimensional Figures

Figure 12:
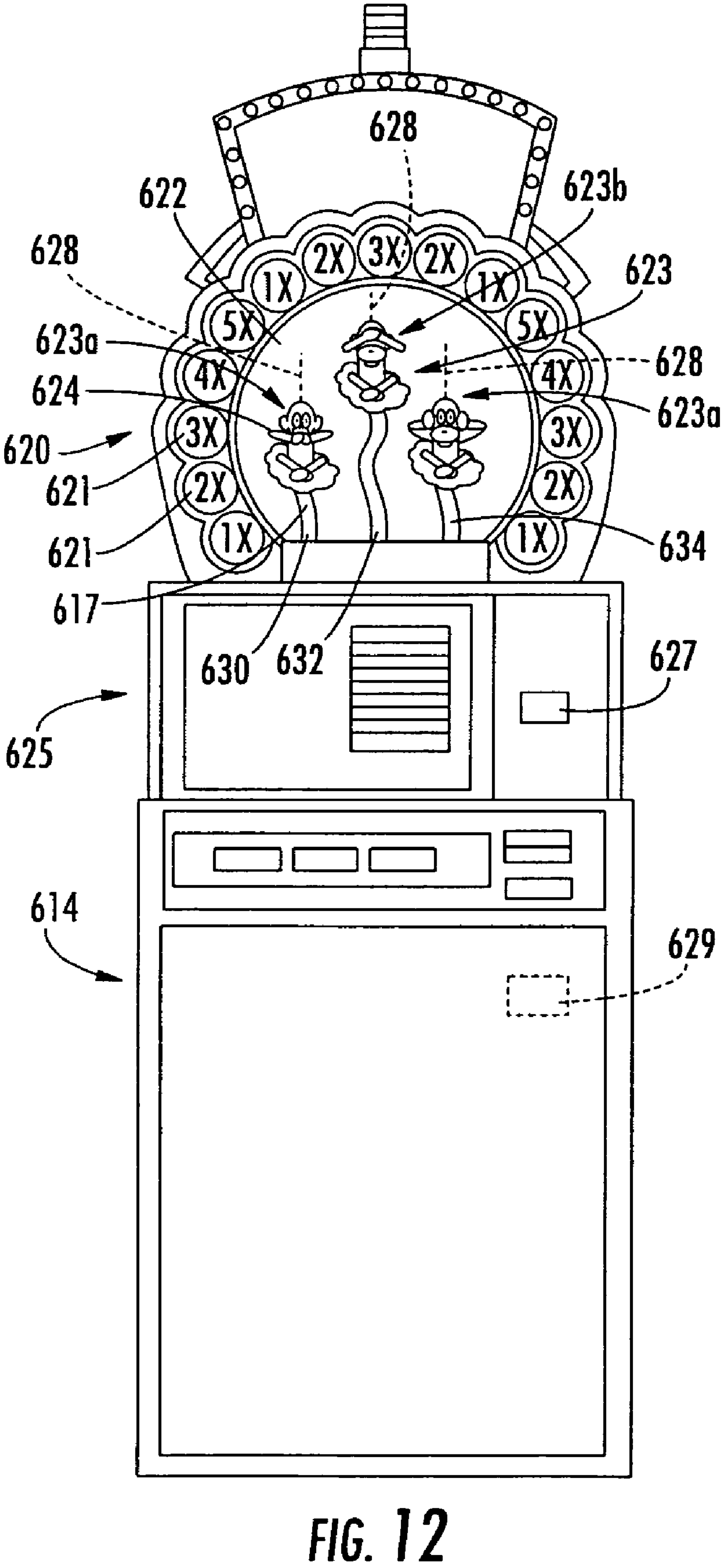
FIG. 12 is substantially a front elevational view of another embodiment of a bonus gaming device.

One example of a gaming device utilizing three dimensional objects, is shown in FIG. 12. FIG. 12 illustrates a display device 620. Display device 620 may have indicator lights 621 that may be, without limitation, multiplier indicator lights 621. Display device 620 may also have payout table 625 to indicate to players the prizes display device 620 offers.

Display device 620 may comprise a display device, or bonus game, controller 627 that is adapted to control the operation of a bonus game. Controllers, like display device controller 627, may be one or more computers or processor boards. In at least one embodiment, controller 627 comprises display device controller 627, which may be manufactured by Eagle Microsystems in Pottstown, Pa. Display device 620 may also include a stepper motor controller (not shown), a core module by Z-World in Davis, Calif., and a sound board by Cleverdevices in Syosset, N.Y. Other, equally suitable devices may be purchased from other manufacturers. Controller 627 may be a single processor or processor board. Furthermore, a gaming device controller 629 and display device controller 627 may be combined in a single processor or processor board.

Display device controller 627 may be adapted to detect when a bonus-activating event occurs in game device 614. This may be accomplished by gaming device controller 629 transmitting a signal to display device controller 627 that a bonus event has occurred. For example, gaming device controller 629 may determine the outcome of each game, and when a bonus-activating outcome occurs, it transmits a signal to display device controller 627. Alternatively, display device controller 627 may periodically interrogate gaming device controller 629. In another embodiment, one or more sensors (not shown) may be provided for determining if a bonus-activating event has occurred. For example, sensors may sense the positions of reels 126 (FIG. 4). When reels 126 are in a bonus activating position, display device controller 627 would sense this position and begin a bonus sequence described below. Sensors (not shown) may also be provided external to game device 614 to detect external bonus-activating events.

Gaming device controller 629 may also transmit a variety of information to display device controller 627. For example, gaming device controller 629 may signal when coins or currency have been inserted, when a game starts, when an error has occurred, and when a sensor detects tampering.

Display device 620 further has symbol display 622 for allowing a player to view at least a portion of a game outcome. Symbol display 622 has at least one display object 623 disposed within symbol display 622. Display object 623 is preferably configured to communicate at least a portion of a game outcome. The number of display objects 623 as well as shapes, designs, and arrangements may vary. In the embodiment shown in FIG. 12, display object 623 may comprise at least one three-dimensional symbol, or image, 624 rotatable on a rotational axis 630. In at least one embodiment, three sets of display objects are provided 623*a*, 623*b*, and 623*c*.

Figure 13:
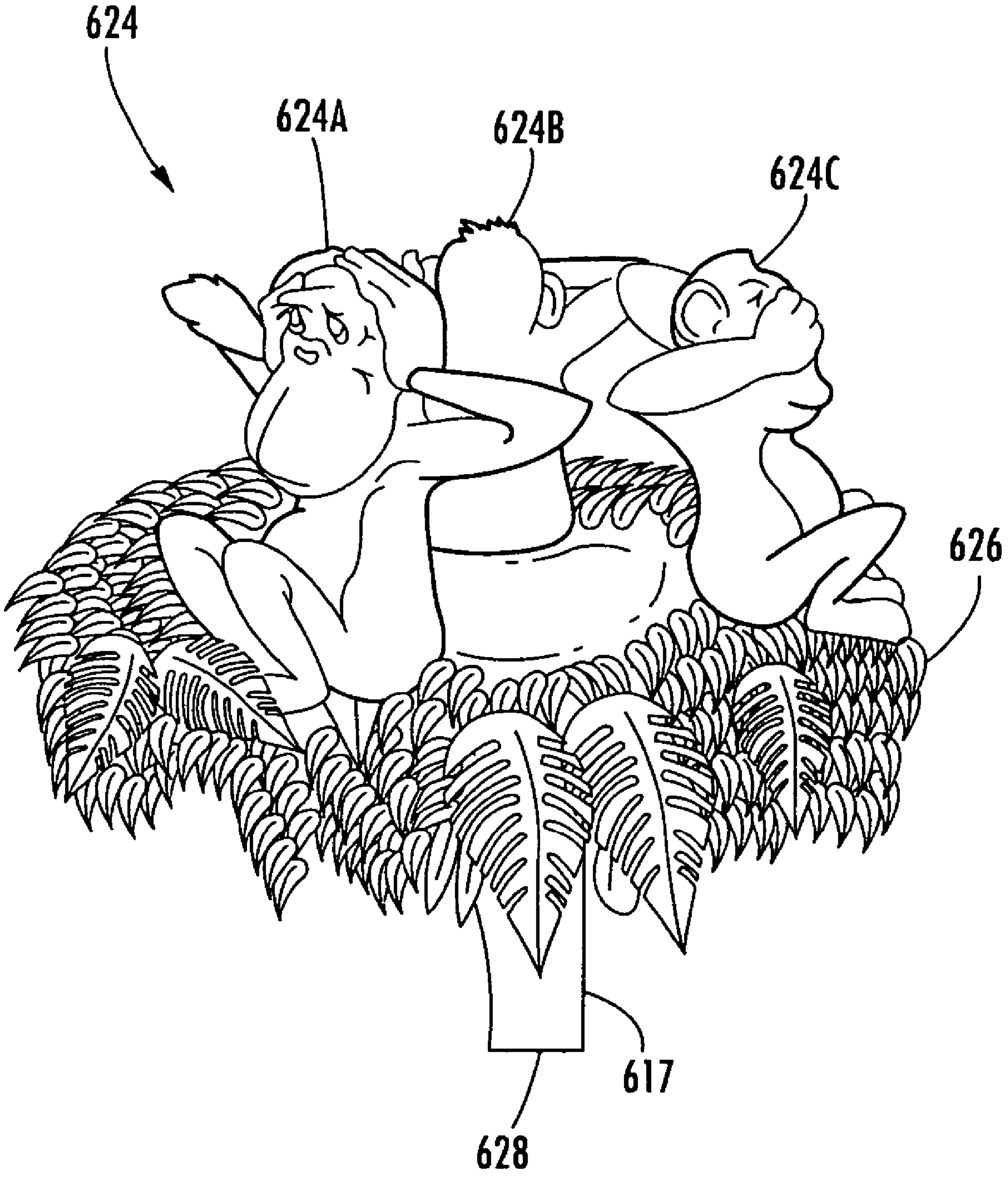
FIG. 13 is substantially a perspective view of the display object of the gaming device of FIG. 12.

Referring now to FIG. 13, each display object 623*a*, 623*b*, and 623*c* may have a plurality of three-dimensional symbols 624*a*, 624*b*, and 624*c*. Each three-dimensional symbol 624*a*,

624*b*, and 624*c* has height, width, and depth. Three-dimensional symbols 624*a*, 624*b*, and 624*c* may be in many different shapes and sizes. For example, as shown in FIG. 13, three-dimensional symbol 624*a*, 624*b*, and 624*c* may be in the form of three monkeys having different poses. Three-dimensional symbols 624*a*, 624*b*, and 624*c* may be rotated around a vertical axis 628 so that a rotational drive mechanism 638 (FIG. 14) can drive display objects 623*a*, 623*b*, and 623*c*.

Three-dimensional symbols 624*a*, 624*b*, and 624*c* may have a common theme recognizable by players. For example, one of the three-dimensional symbols 624*a* has its hands covering both its ears to indicate the sign "hear no evil." Another three-dimensional symbol 624*c* has its hands covering both its eyes to indicate the sign "see no evil." Another three-dimensional symbol 624*b* has its hands covering its mouth (not shown) to indicate the sign "speak no evil."

Of course, three-dimensional symbols 624*a*, 624*b*, and 624*c* may be in various forms, such as a three-dimensional human model, animal model, or combinations of both. Themes may also vary. The number of display objects 623 and the number of three-dimensional symbols 624 on each display object 623 may further vary in number, preferably according to the adopted theme. For example, for three three-dimensional symbols, the "Three Musketeers" or the "Three Little Pigs" may be used as a common theme. For two three-dimensional symbols, "Batman and Robin" may be used as a common theme, and so on. Three-dimensional symbols 624*a*, 624*b*, and 624*c* may be made of ceramic, metal, wood, porcelain, crystal, plastic, polymers, and the like.

Three-dimensional symbols 624*a*, 624*b*, and 624*c* may be attached together and supported by single support, such as pole 617. As support 617 rotates, the angular orientation of the plurality of three-dimensional symbols may change between 624*a*, 624*b*, and 624*c* as well as the outcome that will be communicated to the player. Supports 617 (See FIG. 12) may have varying numbers, shapes, heights, or dimensions.

Platform 626 may be provided. Platform 626 may include decorations, preferably matching a common theme. As shown in FIG. 13, platform 626 serves as a stage for monkeys 624*a*, 624*b*, or 624*c*, and platform 626 is decorated with artificial banana leaves and bananas to add more attraction to the display. Alternatively, three-dimensional symbols 624*a*, 624*b*, and 624*c* may be separate from each other and supported by multiple supports 617 (not shown). Support 617 may be attached to a rotational mechanism 638 (FIG. 14) or a positioning device (not shown) or both, and support 617 may rotate around rotational axis 628, which may be vertically positioned as shown. Rotational axis 628 may also be positioned horizontally or at an angle (not shown).

Figure 14:
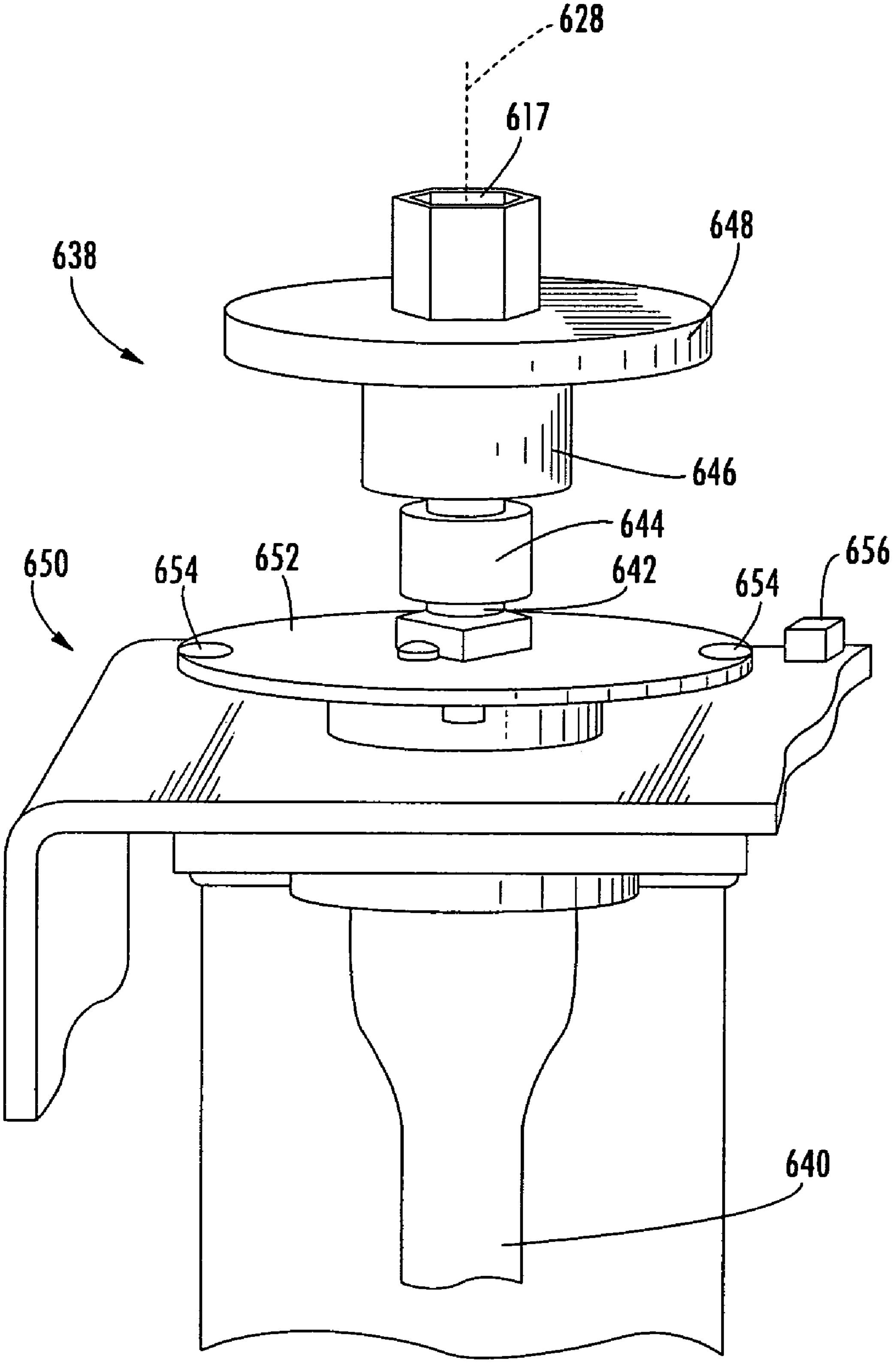
FIG. 14 is substantially a perspective view of an embodiment of a rotational mechanism.

Referring now to FIG. 14, rotational mechanism 638 may include a stepper motor 640 for rotating support 617. Support 617 may be attached to stepper motor 640 through a coupler 644 and a shaft 642 connecting to stepper motor 640. A bearing 648 may be provided in between support 617 and coupler 644 to bear support 617. A bushing 646 may further be provided to secure bearing 648 to support 617. At least one of the plurality of three-dimensional symbols 624*a*, 624*b*, 624*c* (FIG. 13) may be positioned on support 617. In this way, support 617 may rotate around rotational axis 628 (FIG. 13).

Rotational mechanism 638 may further include a positioning device 650 for placing a three-dimensional symbol 624*a*, 624*b*, 624*c* (FIG. 13) in its requisite angular orientation. Positioning device 650 has a wheel 652 attached in between shaft 642 and stepper motor 640. Positioning device 650 further has a sensor 656 for determining the angular orientation of the three-dimensional symbol 624*a*, 624*b*, 624*c* (FIG. 13). Periphery of wheel 652 has at least one notch 654 detectable by sensor 656 and used by the display device controller 627 (FIG. 12) to determine the angular orientation of the three-dimensional symbol 624*a*, 624*b*, 624*c*. As wheel 652 and support 617 are rotated together by stepper motor 640, sensor 656 obtains the angular orientation of the three-dimensional symbol 624*a*, 624*b*, 624*c* by detecting the notch 654 and transmitting a signal to the display device controller 627. Sensor 656 may be an infrared source and detector of a type that is well known in the art. In alternative embodiments, the periphery of wheel 652 may comprise portions with different reflective characteristics, such as absorbent paint lines.

When display device controller 627 detects a bonus-activating event, it may begin a bonus sequence by activating display device 620 (see FIG. 12). Display device 620 may comprise many different kinds of display devices, such as video screens, lights, light emitting diodes, speakers, etc. Display device 620 may have a controller that is adapted to generate a variety of displays.

Display device 620 may indicate that a player has qualified for a bonus round and prompt the player to perform an action. In at least one embodiment, the player is prompted to activate the bonus sequence by pressing input device 16 (FIG. 1). Input device may be a simple button, a keyboard, or a touch screen display. In the embodiment in which the player must accumulate a number of bonus symbols to qualify for a bonus, display device 620 may indicate the number of symbols the player has received.

As shown in FIG. 12-14, when the display device, or bonus game, controller 627 detects the input device 16 (FIG. 1) being activated, the controller 627 activates rotating mechanism 638. Rotating mechanism 638 rotates one selected display object 623 or a selected plurality of display objects 623*a*, 623*b*, or 623*c* around their rotational axis 630, 632, and 634, respectively. Alternatively, rotating mechanism 638 may begin automatically and the input device 16 may be used to initiate a display sequence. In another embodiment, the bonus game controller 627 may wait a predetermined time period for the player to activate the input device 16. If the player does not activate the input device 16 in that time period, the bonus game controller 627 would automatically activate display device 620 and initiate the display sequence. In yet another embodiment, the display device controller 627 automatically initiates the display sequence in a predetermined time period, independent from the input device 16, and the input device 16 is only used to activate rotating mechanism 638. Of course, no input device 16 may be used and the bonus game controller 627 may automatically activate display device 620 and begin the display sequence.

Fractional Three Dimensional Figures

Figure 15:
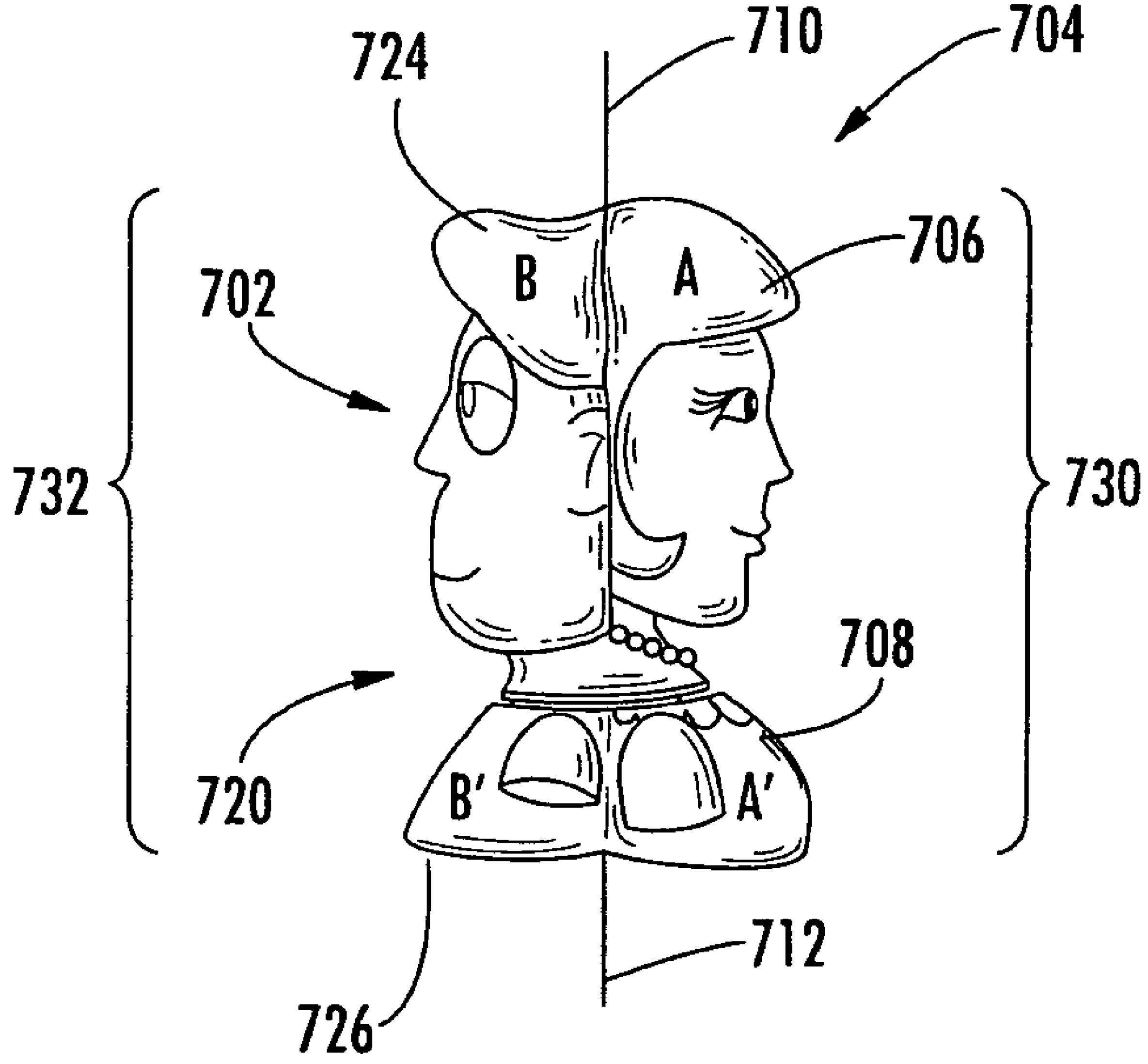
FIG. 15 is substantially a side elevational view of an embodiment of a three-dimensional figure according to the present invention.

The above embodiment related to display objects 623 having whole three dimensional symbols, or images, 624*a*, 624*b*, 624*c* (FIG. 13) where a particular whole image at least partially conveys a game outcome. However, according to the present invention, the display objects 623 and three dimensional images 624*a*, 624*b*, 624*c* (FIG. 13) may be broken up into two or more pieces, or fractional three-dimensional images 706, 708, 724, and 726 (FIG. 15). A game winning outcome may occur when two or more fractional symbols 706, 708, 724, 726 are aligned.

FIG. 15 shows top and bottom sections 704 and 720 of a three dimensional figure 702. Top section 704 comprises three dimensional fractional images 706 and 724 (designated "A" and "B" respectively). Bottom section 720 includes three dimensional fractional images 708 and 726 (designated A' and B' respectively).

Viewed together, fractional images 706 and 708 of top and bottom sections 704 and 720 form a whole, coherent, integrated, recognizable image. For example, fractional image 706 could include a three dimensional fractional image of the upper half of a women's figure and fractional image 708 could be a three dimensional fractional image of the lower half of a woman's figure. Additionally, viewed together, fractional images 724 and 726 of top and bottom sections 704 and 720 may form a whole, coherent, integrated, recognizable image. For example, fractional image 724 could be a three dimensional fractional image of the upper half of a man's figure and fractional image 726 could be a three dimensional fractional image of the lower half of the man's figure.

Top section 704 may be attached to a first drive mechanism 710. Bottom section 720 may be attached to a second drive mechanism 712 so that each three dimensional section 704, 720 preferably is moveable relative to the other. Of course, other arrangements are possible. Various drive mechanisms will be discussed further below.

Although FIG. 15 shows three dimensional figure 702 as having two separate images 730, 732 that are each divided into fractions 706, 708, 724, 726, the invention is not so limited. For example, more than two images could be used. Each image could be broken into any number of fractions. More images and/or fractions may allow for more game play possibilities. In addition, three dimensional-figure 702 may be any representation desired by a game designer, and may be chosen to go with a theme of the game. Suitable images may, but not limited, to people, celebrities, politicians, sports figures, historical figures, vehicles, boats, animals, buildings, representations of prizes, and other images represented in a three dimensional manner. Also, the three dimensional figure 702 could be divided into any number of sections rather than just top and bottom sections 704, 720 shown in FIG. 15.

Figure 16:
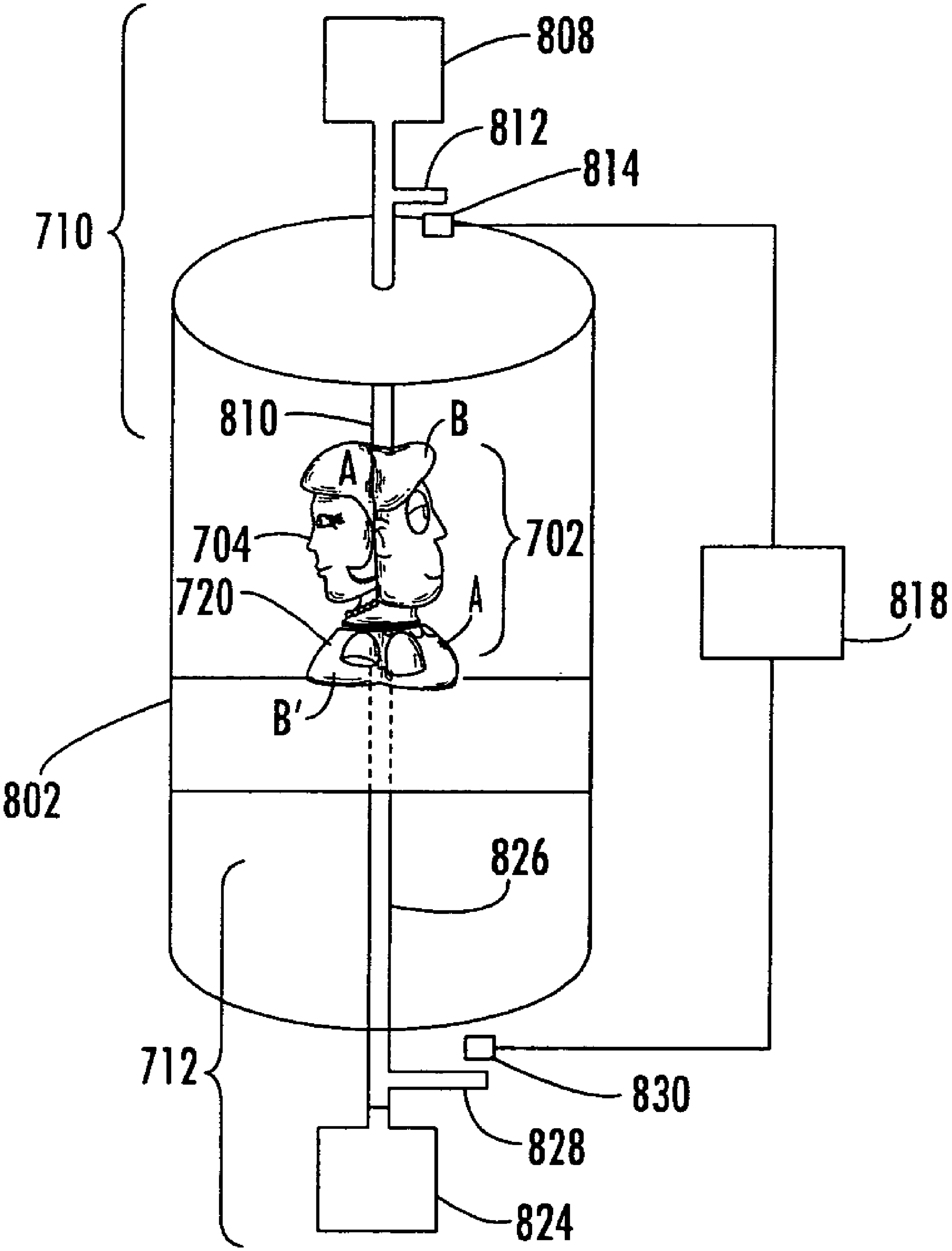
FIG. 16 is substantially a front view of a three-dimensional figure and actuator according to the present invention.

FIG. 16 depicts actuating mechanisms 710 and 712 for three-dimensional figure 702. As shown in FIG. 16, top section 704 of three dimensional figure 702 is attached to first actuating mechanism 710. First actuating mechanism 710 may include an actuator 808. Actuator 808 may be a motor, such as a servo motor, a gear motor, a stepper motor, a dc motor, and the like. Actuator 808 may be configured to rotate shaft 810 that may be attached to top section 704.

A positioning system may be included to aid in properly orienting top section 704. In one embodiment, the positioning system may include projection 812 and sensor 814. Sensor 814 may be an optical sensor. When projection 812 passes sensor 814, the optical signal transmitted to controller 818 will change, communicating the position of top section 704 to processor 818.

Bottom section 720 of three-dimensional figure 702 may have a second actuating mechanism 712. Second actuating mechanism 712 may include an actuator 824. Actuator 824 may be a motor, such as a servo motor, a gear motor, a stepper motor, a dc motor, and the like. Actuator 824 may be configured to rotate shaft 826 that may be attached to bottom half 720. Shaft 826 may extend through other display elements, such as base 802.

A positioning system may be included to aid in properly orienting bottom section 720. The positioning system may include a projection 828 and a sensor 830. Sensor 830 may be an optical sensor. When projection 828 passes sensor 830, the optical signal transmitted to controller 818 will change, communicating the position of bottom section 720 to controller 818.

Figure 17:
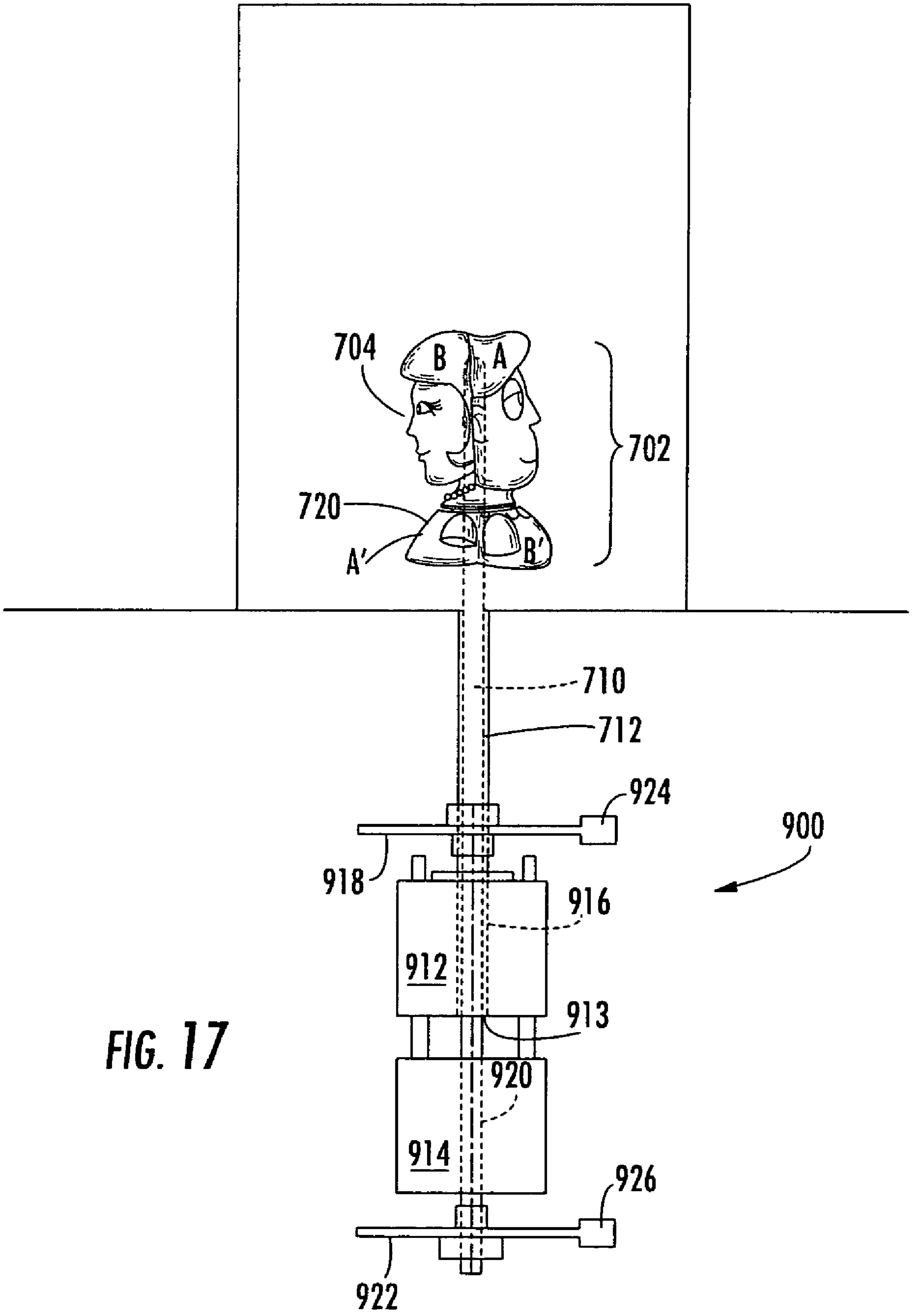
FIG. 17 is substantially a front view of another embodiment of a three-dimensional figure and actuator according to the present invention.

An alternate actuating mechanism is shown in FIG. 17. A similar mechanism is disclosed in Applicants' copending U.S. application Ser. No. 10/245,625, filed Sep. 16, 2002, the disclosure of which is expressly incorporated by reference. Actuating mechanism 900 may be provided for selectively positioning top section 704 and bottom section 720 of three-dimensional figure 702.

In the illustrated embodiment, actuating mechanism 900 may have a first stepper motor 912 and a second stepper motor 914. First stepper motor 912 may have a tube 916 that attaches to bottom section 720 of three-dimensional figure 702, acting as a second actuating mechanism 712. Tube 916 preferably has a hollow center and is positioned within a central bore 913 of first stepper motor 912.

Second stepper motor 914 may have a shaft 920, which passes through first stepper motor 912 in tube 916 and attaches to top section 704 of three-dimensional figure 702, thereby acting as a first actuating mechanism 710. Top section 704 and bottom section 720 of three-dimensional figure 702 may be moved clockwise or counterclockwise and may operate independently of each other.

Animation mechanism 900 may further have at least one positioning system. A second positioning system 922 may be attached to end of shaft 920 opposite to the shaft end attached to top section 704 of three-dimensional figure 702. The end of tube 916 opposite to the end attached to bottom section 720 of three-dimensional figure 702 may be attached to first positioning system 918. First positioning system 918 and second positioning system 922 allow for tracking the position of top and bottom sections 704 and 720. First positioning system 918 and second positioning system 922 may have sensors 924 and 926 that detect rotation and transmit signals that can be used to determine the angular position of top section 704 and bottom section 720 of three-dimensional figure 702. A controller (not shown in FIG. 17, but may be similar to controller 818 of FIG. 16) may be in communication with actuating mechanism 900 to selectively position top section 704 and bottom section 720 of three-dimensional figure 702.

Various combinations of the actuators of FIGS. 16 and 17 may be used in the present invention. For example, if it is desired to a have three moveable sections, one of the actuating mechanisms 710, 712 of FIG. 16 may be replaced with the mechanism 900 shown in FIG. 17. If it is desired to have four moveable sections, both actuating mechanisms 710, 712 of FIG. 16 may be replaced with the mechanism 900 shown in FIG. 17. Of course, other actuating and positioning systems may be used without departing from the scope of the present invention. In addition, although the three-dimensional sections 704, 720 have been illustrated as rotating about a vertical rotational axis, the present invention is not limited to any particular rotational axis. For example, the three-dimensional sections could be configured to rotate about a horizontal rotational axis, such as in conventional slot machines.

Figure 18:
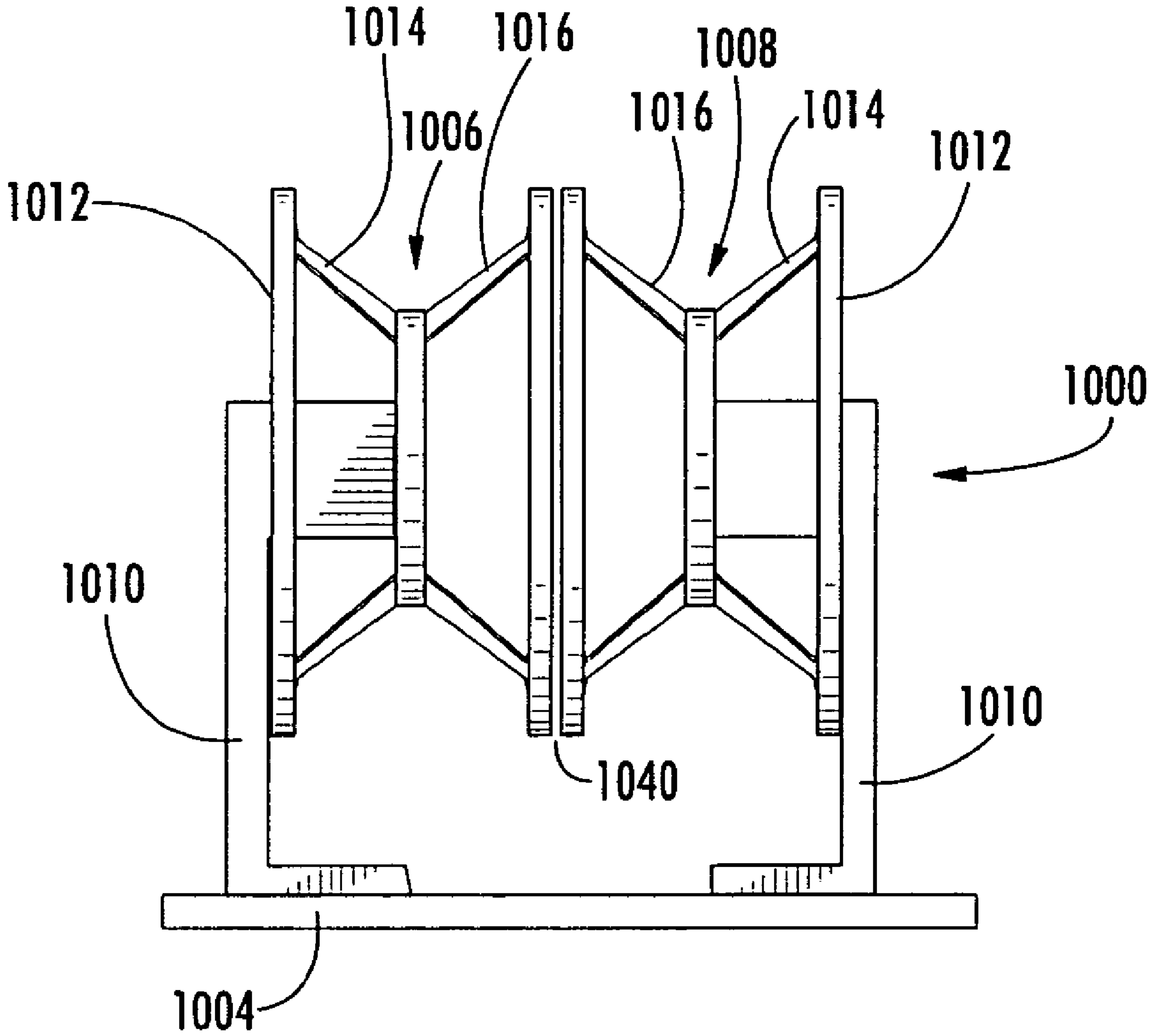
FIG. 18 is substantially a front elevational front view of an embodiment of a reel mechanism.

One more exemplary actuating mechanism is shown in FIG. 18, and is described in detail in Applicants' co-pending application Ser. No. 09/968,952, filed Oct. 1, 2001. That application describes a novel reel shelf that allows two or more reels to be positioned in relatively close proximity to each other. Because the reels are closer together than in prior reel configurations, fractional images appearing on adjacent reels are more easily viewed as a whole image by players.

For example, with reference to FIG. 18, a suitable reel mechanism 1000 may contain at least a first reel assembly 1006 and a second reel assembly 1008 attached to support member 1004. Each reel assembly 1006, 1008 may comprise at least one chassis 1010 attached to support member 1004 and at least one reel 1012 rotatably attached to chassis 1010. Each reel 1012 comprises a first side or fastening side 1014 and a second side or non-fastening side 1016, first side 1014 being attached to the chassis 1010. First reel assembly 1006 and second reel assembly 1008 are positioned side-by-side in an opposing relationship. Second side 1016 of reel 1012 of first reel assembly 1006 is positioned proximate or adjacent to second side 1016 of reel 1012 of second reel assembly 1008. Reels 1012 may be vertically aligned. This configuration is advantageous because reel assemblies 1006 and 1008 are positioned so that the chassis 1010 of each reel assembly 1006 and 1008 is peripherally positioned rather than centrally positioned between reel assemblies 1006 and 1008, as in conventional reel assemblies. As a result, the gap 1040 between reel assemblies 1006 and 1008 is substantially reduced and a player can more easily form a whole image from a plurality of fractional images on different reels.

Figure 19:
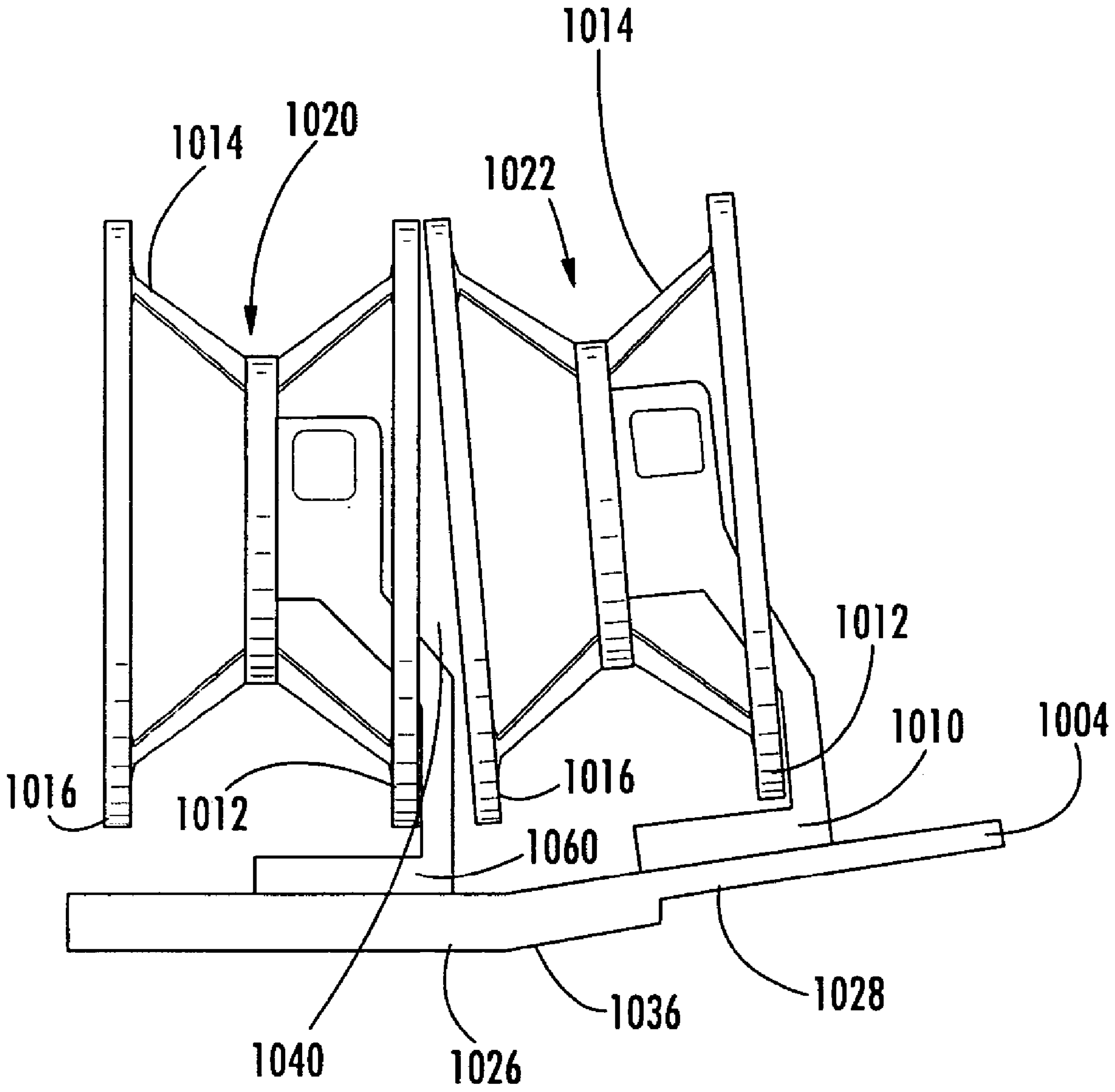
FIG. 19 is substantially a front elevational front view of another embodiment of a reel mechanism.

FIG. 19 shows a related embodiment in which more than two reel assemblies may be placed proximate to each other. FIG. 19 illustrates at least one support member 1004, a first reel assembly 1020 and a second reel assembly 1022. Each reel assembly 1020, 1022 may comprise a reel 1014 with a first side 1012 and a second side 1016 and a chassis 1010 rotatably attached to first side 1012. As shown in FIG. 19, reel assembly 1022 is angularly mounted so that a portion of second side 1016 of second reel assembly 1022 is proximate or adjacent to first side 1012 of reel assembly 1020. This may also be expressed in terms of axes of rotation. Each reel 1014 rotates around an axis. In this embodiment, the axes of rotation are nonparallel. This angular relationship allows chassis 1010 of the first reel assembly 1020 to be positioned between reels 1014. The magnitude of the angle between first reel assembly 1020 and second reel assembly 1022 depends on the size of reels 1014 and the thickness of chassis 1010. In order to minimize the angle and make the angle less noticeable to players, it may be desirable to utilize large diameter reels and a narrow chassis.

Figure 20:
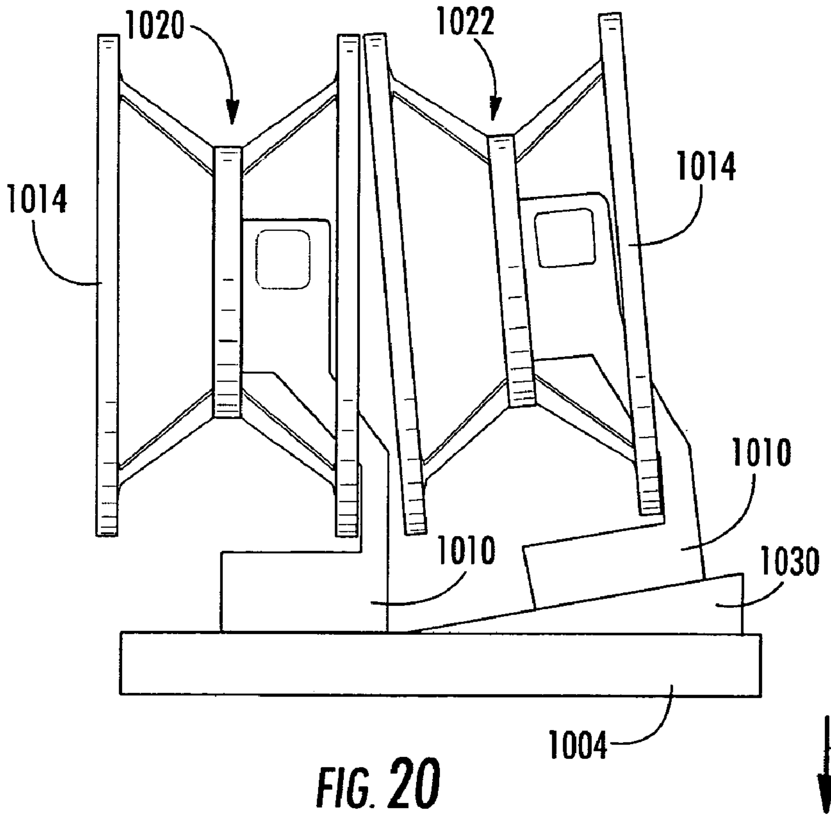
FIG. 20 is substantially a front elevational view of another embodiment of a reel mechanism.

Second reel assembly 1022 may be angularly supported in a number of different ways. As seen in FIG. 19, support member 1004 may comprise a first surface 1026 and a second surface 1028 that are joined by a bent section 1036, first surface 1026 being nonparallel to second surface 1028. First reel assembly 1020 is attached to first surface 1026 and second reel assembly 1022 is attached to second surface 1028, thereby creating a nonparallel relationship between the two reel assemblies. In an alternative embodiment (not shown), two support members may be used that have nonparallel surfaces for mounting the first and second reel assemblies. Referring to FIG. 20, the present invention may also comprise a wedge 1030 mounted between chassis 1010 of second reel assembly 1022 and support member 1004.

Figure 21:
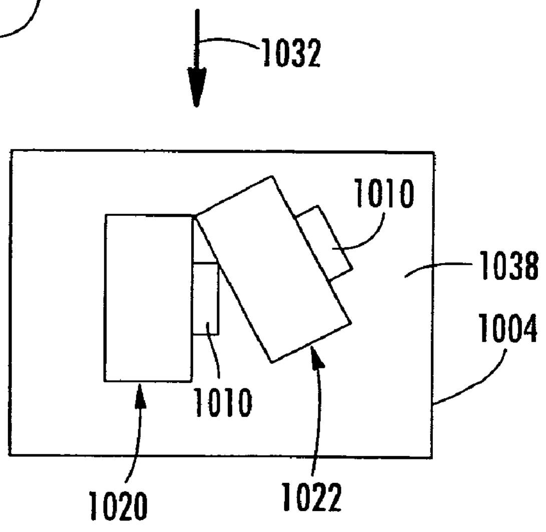
FIG. 21 is substantially a top plan view of another embodiment of a reel mechanism.

Referring to FIG. 21, support member 1004 may have a substantially planar surface 1038 and first and second reel assemblies 1020 and 1022 are mounted at an angle relative to each other on the surface. In this embodiment, a player would view the reel assemblies 1020, 1022 from the direction of arrow 1032. In at least one embodiment, the angularly supported reel assemblies are vertically aligned. In at least another embodiment, the angularly supported reel assemblies are horizontally aligned. In other embodiments, the angularly supported reel assemblies can be diagonally aligned or aligned other ways.

As may be apparent from the above description various combinations of angled and opposing reel assemblies may be used to provide as many moveable sections as are desired by a game designer. In addition, with reference again to FIG. 15, it is not necessary that all sections 704, 720 of three-dimensional figure 702 move. For example, top section 704 could be fixed and bottom section 726 movable, with the object of a game being to properly align the fractional images 708, 712 of bottom section 720 with their corresponding fractional images 706, 724 to form a specific three-dimensional figure 702.

As was discussed above for whole three-dimensional figures, top section 704 and bottom section 720 (and any additional sections, if three dimensional figure 702 is broken into more than two moveable portions) of three-dimensional figure 702 made be constructed from ceramic, metal, wood, porcelain, crystal, plastic, polymers, and the like.

The top and bottom sections 704, 720 of three-dimensional figure 702 may be attached to an actuating mechanism in any number of ways. For example, the portions of three-dimensional figure 702 may be hollow and sized to fit around a frame, such as a reel 1014 shown in FIGS. 18-21. The three dimensional figure 702 may be glued or otherwise adhered to the outer surface of the reel 1014. Fasteners, such as nails, screws, bolts, and the like, may be used to attach portions of three-dimensional figure 702 to portions of a corresponding actuating mechanism. Alternately, an attachment point to an actuating mechanism can be integrally formed on portions of three-dimensional figure 702, such as by inclusion of the attachment point in a mold or cast. The present invention is not limited to any particular method of construction, attachment, or actuation.

Game play with three-dimensional FIGS. 702 of the present invention may correspond to any previously discussed fractional image embodiments, or additional game play methods within the ken of the person of ordinary skill in the art.

CONCLUSION

The present invention solves many of the problems associated with the prior art. The present invention provides a gaming device that adds to player satisfaction and excitement. The present invention also provides a gaming device that is readily distinguishable from conventional slot machines. The present invention provides a gaming device that awards a prize when several three-dimensional fractional images are displayed as a complete three-dimensional image. The present invention provides a gaming device that allows a game to be played a randomly determined number of times and also randomly generates a multiplier to provide for larger prizes.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A gaming device, comprising:

(A) at least one three dimensional figure, the at least one three dimensional figure comprising a plurality of three-dimensional sections;

(a) the plurality of three-dimensional sections having a height, a width, and a depth;

(b) at least one of the plurality of three-dimensional sections being moveable relative to the other sections;

(c) the moveable three-dimensional section comprising a plurality of three-dimensional fractional images;

(d) the moveable three-dimensional section being positionable to allow a player to view the plurality of three-dimensional fractional images by moving the moveable three-dimensional section; and (e) wherein when the moveable three-dimensional section is in at least one position, the plurality of three-dimensional sections form at least one whole, integrated three-dimensional image;

(B) at least one actuator attached to the moveable three-dimensional section, the at least one actuator configured to move the moveable three-dimensional section;

(C) at least one controller in communication with the at least one actuator, the at least one controller comprising a random number generator and being configured to randomly determine a game outcome and to cause the at least one actuator to move the moveable three-dimensional section to at least partially convey the game outcome to the player; and (D) a gaming apparatus configured to allow the player to place a wager and play a game of chance, the game of chance comprising the randomly determined game outcome, wherein arrangement of the plurality of three-dimensional sections conveys the randomly determined game outcome.

2. The gaming device of claim 1 wherein the plurality of three-dimensional sections are positioned around a common axis.

3. The gaming device of claim 2, wherein the common axis is substantially vertical.

4. The gaming device of claim 2, wherein at least two of the plurality of three-dimensional sections are moveable about the common axis, each of the at least two moveable sections being attached to the at least one actuator in communication with the at least one controller.

5. The gaming device of claim 4, wherein each of the at least two moveable three-dimensional sections comprises three fractional images that may, when properly aligned, form three whole, integrated three-dimensional images.

6. The gaming device of claim 2, wherein the moveable three-dimensional section comprises n fractional images that may, when properly aligned, form n whole, integrated images, where n is an integer.

7. The gaming device of claim 1, wherein the at least one whole, integrated three-dimensional image comprises an image of an animal.

8. The gaming device of claim 1, wherein the at least one whole, integrated three-dimensional image comprises an image of a human.

9. The gaming device of claim 1, wherein a prize is awarded to the player when the plurality of three-dimensional sections are arranged such that the whole, integrated three-dimensional image is displayed to the player.

10. The gaming device of claim 9, further comprising awarding the player a partial prize based on a number of the plurality of three-dimensional sections that correspond to the whole, integrated three-dimensional image.

11. The gaming device of claim 1 wherein the plurality of three-dimensional sections are made of plastic.

12. The gaming device of claim 1, wherein moving the moveable three-dimensional section changes the orientation of the plurality of fractional images thereon.

13. The gaming device of claim 1, further comprising a sensor in communication with the at least one controller, the sensor configured to detect the position of the moveable three-dimensional section.

14. The gaming device of claim 1, further comprising a primary game, wherein the at least one three-dimensional figure is associated with a bonus game.

15. The gaming device of claim 1 wherein each of the plurality of three-dimensional sections comprises, and is attached to, a reel mechanism.

16. A method of playing a game, comprising, but not necessarily in the order shown:

(A) allowing a player to place a wager on a game of chance;

(B) moving at least a first moveable three-dimensional section comprising a plurality of fractional three-dimensional images, each of the fractional three-dimensional images having a height, a width, and a depth;

(C) randomly determining an outcome of the game of chance comprising providing a controller using a random number generator to generate a combination of fractional three-dimensional images;

(D) selecting at least one of the plurality of fractional three-dimensional images to at least partially convey the outcome of the game of chance to the player;

(E) positioning the selected fractional three-dimensional image next to at least a second fractional image so that the player may see the selected fractional three-dimensional image; and (F) awarding the player a prize if the selected fractional image and the second fractional image form a predefined, unitary image.

17. The method of claim 16, wherein step (B) comprises rotating the first moveable three-dimensional section about a rotational axis.

18. The method of claim 17 wherein the rotational axis is vertical.

19. The method of claim 16, further comprising:

(A) moving a plurality of moveable three-dimensional sections relative to each other, each of the plurality of moveable three-dimensional sections comprising n fractional images that, when properly aligned, may form n predefined, unitary images; and (B) awarding a partial prize based on the number of properly aligned n fractional images.

20. The method of claim 16 further comprising allowing the player to play a primary game of chance, wherein steps A-F occur in a bonus game.

21. A gaming device, comprising:

(A) a plurality of three-dimensional section means, at least one of the plurality of three-dimensional section means being moveable relative to the other three-dimensional section means, the moveable three-dimensional section means comprising a plurality of fractional image means for communicating a randomly determined game outcome, each of the fractional image means having a height, a width, and a depth, wherein when the moveable three-dimensional section means is in at least one position, the plurality of three-dimensional section means form a unitary, predefined three-dimensional image;

(B) positioning means for moving the moveable three-dimensional section means; and (C) controller means in communication with the positioning means, the controller means comprising a random number generation means and configured to randomly determine the game outcome and to cause the positioning means to move the moveable three-dimensional section means to communicate the random game outcome.

22. The gaming device of claim 21, further comprising a sensor means for determining the position of the moveable three-dimensional section means and communicating the position to the controller means.

23. The gaming device of claim 21, further comprising a gaming means for accepting a wager from a player and presenting the player with a game.

24. The gaming device of claim 23 wherein the gaming means includes a primary game and the plurality of three-dimensional section means are associated with a bonus game.

25. The gaming device of claim 21 wherein the moveable three-dimensional section means is rotatable about a vertical rotational axis.

26. The gaming device of claim 25, wherein the rotational axis is substantially horizontally positioned.

27. The gaming device of claim 21, wherein at least one unitary, predefined three-dimensional image comprises an image of at least one animal.

28. The gaming device of claim 21, wherein at least one unitary, predefined three-dimensional image comprises an image of at least one human.

29. The gaming device of claim 1 wherein the gaming apparatus further comprises a value acceptor that allows the player to place the wager using the value acceptor.

30. A method of playing a game, comprising, but not all necessarily in order shown:

(A) allowing a player to place a wager on a game of chance;

(B) moving at least a first moveable three-dimensional section of a plurality of moveable three-dimensional sections wherein each of the plurality of three-dimensional sections comprises a plurality of fractional three-dimensional images, each of the fractional three-dimensional images having a height, a width, and a depth;

(C) randomly determining an outcome of the game of chance comprising generating a combination of three-dimensional sections using a controller comprising a random number generator;

(D) positioning the at least first three-dimensional section relative to the other three-dimensional sections to at least partially convey the outcome of the game of chance to the player; and (E) awarding the player a prize if the fractional three-dimensional images of the plurality of three-dimensional sections align to form a whole, coherent, integrated, recognizable image as a result of step (D).

31. The method of claim 30, wherein step (B) comprises rotating the first moveable three-dimensional section about a rotational axis.

32. The method of claim 31 wherein the rotational axis is vertical.

33. The method of claim 30, further comprising:

(A) moving the plurality of moveable three-dimensional sections relative to each other, each of the plurality of moveable three-dimensional sections comprising n fractional images that, when properly aligned, may form n whole, coherent, integrated, recognizable images; and (B) awarding a partial prize based on a number of properly aligned n fractional images.

34. The method of claim 31 further comprising allowing the player to play a primary game of chance, wherein steps A-E occur in a bonus game.

* * * * *